US008059593B2

(12) United States Patent
Shih et al.

(10) Patent No.: US 8,059,593 B2
(45) Date of Patent: Nov. 15, 2011

(54) DISTRIBUTED CHANNEL ALLOCATION METHOD AND WIRELESS MESH NETWORK THEREWITH

(75) Inventors: Yung-Chien Shih, Taipei (TW); Jen-Shun Yang, Hsinchu (TW); Chien-Chao Tseng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 988 days.

(21) Appl. No.: 11/829,952

(22) Filed: Jul. 29, 2007

(65) Prior Publication Data

US 2008/0240026 A1 Oct. 2, 2008

(30) Foreign Application Priority Data

Apr. 2, 2007 (TW) .............................. 96111609 A

(51) Int. Cl.
*H04W 4/00* (2009.01)
(52) U.S. Cl. .......................... 370/329; 455/450; 455/509
(58) Field of Classification Search .................. None
See application file for complete search history.

(56) References Cited

U.S. PATENT DOCUMENTS

| 7,420,952 | B2* | 9/2008 | da Costa et al. ............... 370/338 |
| 7,769,843 | B2* | 8/2010 | Neuse et al. ................... 709/223 |
| 2003/0185225 | A1* | 10/2003 | Wirth et al. .................... 370/419 |
| 2005/0208949 | A1* | 9/2005 | Chiueh ......................... 455/452.2 |
| 2006/0072502 | A1 | 4/2006 | Crandall et al. |
| 2006/0121946 | A1* | 6/2006 | Walton et al. .................. 455/561 |
| 2007/0070937 | A1* | 3/2007 | Demirhan et al. ............. 370/328 |
| 2009/0175238 | A1* | 7/2009 | Jetcheva et al. ............... 370/329 |

* cited by examiner

*Primary Examiner* — Chi Pham
*Assistant Examiner* — Mohammad Adhami
(74) *Attorney, Agent, or Firm* — Jianq Chyun IP Office

(57) ABSTRACT

A distributed channel allocation method and a wireless mesh network with the same are provided herein. By the distributed channel allocation, interference situations are avoided in a wireless network communication, and the allocated bandwidth can then be fully utilized. Besides, unnecessary depletion of an allocated bandwidth due to the interference can be avoided. By this method, a time division technique is applied for dividing a transmission time of each wireless NIC, and different non-overlapping channels can be assigned to different timeslots. Different from other researches that require a symmetrical number of the NICs between a receiving node and a transmitting node, in this method, a unique wireless NIC may communicate with the wireless NICs. The method provides the feature that the number of the NICs on a certain node can be adjusted to meet a communication requirement, by which the efficiency of a network flow is also significantly improved.

18 Claims, 21 Drawing Sheets

DISTRIBUTED CHANNEL ALLOCATION METHOD AND WIRELESS MESH NETWORK THEREWITH

CROSS-REFERENCE TO RELATED APPLICATION

This application claims the priority benefit of Taiwan application serial no. 96111609, filed Apr. 2, 2007. All disclosure of the Taiwan application is incorporated herein by reference.

BACKGROUND OF THE INVENTION

1. Field of the Invention

The present invention relates to a channel allocation method of a wireless network and a system thereof. More particularly, the present invention relates to a distributed channel allocation method of a wireless mesh network and a system thereof.

2. Description of Related Art

In recent years, there is a rapid development in the field of wireless broadband access techniques including Wi-Fi (IEEE 802.11 series), WiMAX (IEEE 802.16 series) and 3G, etc. The wireless mesh network (referred to hereinafter as WMN, IEEE 802.11s) is one of the key techniques integrated with the wireless broadband network. The structure of the WMN illustrated in FIG. 1 is a mesh network based on a wireless transmission interface, and the WMN has a similar operation mode to that of an Ad-hoc network. Since the operation of the WMN is based on the wireless transmission interface, it has the advantage of rapid deployment without restriction of the geographical landforms. The WMN is generally applied to a community network, a temporary network of exhibition halls or shopping stalls, networks established in disaster areas or areas having special geographical environments, and so on.

The operation of the WMN is based on the wireless transmission interface. Taking the IEEE 802.11a/g for an example, its transmission bandwidth of data is 54 Mbps (mega bytes per second), which is the maximum possible transmission bandwidth. However, influenced by a MAC (media access control) contention, 802.11 headers, 802.11 ACK signals and packet errors, an average applicable bandwidth is usually less than half of the maximum bandwidth.

Furthermore, the most serious issue lies in that a data transmission rate of a network link layer may be decreased greatly due to signal interference. Two possible interference problems are shown in FIG. 2: (1) interference in the same transmission path, (2) interference in the adjacent transmission paths. Referring to FIG. 2, the signal coverage of a node 3 includes nodes 2, 4 and 9. Similarly, the node 3 is simultaneously in the signal coverage of the nodes 2, 4 and 9. A first transmission path and a second transmission path are paths for data transmission. The first transmission path is taken for an example. When the node 2 and the node 3 are transmitting data, the node 4 may receive signals from the node 3, resulting in the fact that node 4 cannot transmit data to a node 5 provisionally. Therefore, the bandwidth of the first transmission path is reduced, which refers to the so-called interference in the same transmission path.

On the other hand, referring to the node 9 on the second transmission path, since the node 9 is in the signal coverage of the node 3, the node 9 may receive signals from the node 3 when the node 2 and the node 3 are transmitting data, resulting in the fact that the node 9 cannot transmit data to a node 8 or a node 10 provisionally. The phenomenon indicating an interference of data transmission through the first transmission path with that through another transmission path (a second transmission path) represents the so-called interference in the adjacent transmission paths. Therefore, many studies are performed on the WMN to learn how to improve an applicable bandwidth of the WMN by advancing a structural design thereof.

According to the IEEE 802.11s WiFi Mesh standard, a plurality of wireless transmission interfaces is allowed to use different non-overlapping channels for transmission, so as to increase the transmission bandwidth. Therefore, some studies have been developed to increase a network flow by applying multi-network interface cards (referred to hereinafter as Multi-NIC). A method of increasing the network flow includes allocating a plurality of NICs on each node, and each of the NICs may employ a different non-overlapping channel to communicate with other nodes. The advantage of this method lies in that it is unnecessary to modify any existing hardware structures. Only is an integral channel allocation method required for assisting the existing hardware structure, and the network flow can be substantially improved.

A method and a system for assigning channels in a wireless local area network (WLAN) is disclosed in U.S. Publication No. 2006/0072502 A1, in which the WLAN infrastructure mode (i.e. a client to hub communication mode) is provided. A mobile node (referred to hereinafter as MN) in the network is connected to an access point (referred to hereinafter as AP) by means of one hop, and the other end of the AP is connected to a wired network, wherein each AP has at least two applicable channels, and each AP is at least adjacent to another AP.

Each AP constantly collects the traffic load information and forecasts a possible throughput on each channel. Thereafter, the AP determines an optimal channel for connecting with the MN within the signal coverage of the AP. However, this channel allocation method only takes the optimal channel within one hop between the AP and the MN into account. Therefore, the application of the method is limited.

Most of the early studies focus on modifying an MAC layer protocol of the network to support a multiple channel transmission. The studies aim to find the optimal channel for transmitting every single packet, so as to avoid the interference. On the other hand, a concept of a Multi-NIC disclosed by V. Bahl et al. and P. H. Hsiao et al. in two articles has drawn attention and discussions recently. One of the articles was authored by V. Bahl, A. Adya, J. Padhye, A. Wolman, entitled "Reconsidering the Wireless LAN Platform with Multiple Radios" Workshop on Future Directions in Network Architecture (FDNA-03), while another one was authored by P. H. Hsiao, A. Hwang, H. T. Kung, and D. Vlah, entitled "Load-Balancing Routing for Wireless Access Networks" Proc. of IEEE Infocom 2001. The method disclosed therein is to install a plurality of the NICs on each node of the Ad-hoc network, and each NIC may dynamically determine a channel for communicating with other nodes. The advantage of this method lies in that it is unnecessary to modify any existing hardware structures. Only is the integral channel allocation method required for assisting the existing hardware structure, and the network flow can be substantially improved. Sequentially, a channel allocation method based on a centralize structure was disclosed by A. Raniwala, K. Gopalan, T. Chiueh, entitled "Centralized channel assignment and routing algorithms for multi-channel wireless mesh networks," ACM Mobile Computing and Communications Review 8 (2) (2003), which is one of the earliest articles having a formal definition of the channel allocation. In the method, a load-aware channel assignment is performed by an evaluation matrix defined by the authors themselves, the entire network is calculated in overall, and a preferable channel allocation is obtained. Thus, a maximum network flow is then achieved.

In recent studies, a channel allocation technique based on a dynamic & distributed structure has been disclosed, wherein channel allocation information is exchanged by using a common channel framework according to the IEEE 802.11s standard. This technique is based on IEEE 802.11 WLAN standard, wherein a plurality of wireless NICs is installed to support a multi-channel transmission. However, the interference still cannot be avoided in the aforementioned techniques.

SUMMARY OF THE INVENTION

The present invention is directed to a channel allocation method for a mesh network having a multi-wireless network interface, by which the interference among nodes can be avoided, and an applicable bandwidth can be guaranteed.

The present invention is directed to a Wi-Fi mesh network, and directed to a channel allocation method for backhaul routers in a WMN, in which the WMN has a feature of multi-hop similar to that of the ad-hoc network. Thus, not only one optimal channel of one hop between an AP and a MN is considered, but also the suitable channels are assigned to all hops passed by an entire routing path. Meanwhile, the existing allocated channels are not interfered.

The present invention is directed to a distributed channel allocation method for a mesh network having a wireless network interface. By the distributed channel allocation method, the interference is avoided in the wireless network communication, such that an allocated bandwidth can be fully utilized, and unnecessary depletion of the allocated bandwidth due to the interference can be avoided.

The present invention is directed to a distributed channel allocation method for a mesh network having a wireless network interface. By this method, a time division technique is applied for dividing a transmission time of each wireless NIC, and different non-overlapping channels can be assigned in different timeslots, which is different from other studies that require a symmetrical number of the NICs between a receiving node and a transmitting node. Moreover, in this method, a unique wireless NIC may communicate with a plurality of the wireless NICs. The method provides the feature that the number of the NICs on a certain node can be adjusted to meet a communication requirement, and efficiency of a network flow is also significantly improved.

The present invention provides a distributed channel allocation method for a WMN. By the distributed channel allocation method, free channels between adjacent nodes are determined according to a channel utilization of the network nodes. According to a routing path, the nodes which the routing path passes through are selected, and thereby a start node and a target node are determined upon the above selected nodes. The free channels to be used are selected in a sequence from the target node to the start node, such that the routing path is established. The selection of the free channels is in accordance with a requirement of a shortest routing path, and the selected free channels to be used are different from those used by the adjacent nodes.

The present invention provides a distributed channel allocation method for a WMN. By the distributed channel allocation method, free channels between the adjacent nodes are determined according to a channel utilization of the nodes. According to a routing path, the nodes which the routing path passes through are selected, and thereby a start node and a target node are determined upon the above selected nodes. The number of the NICs on the nodes is determined according to a requirement of a bandwidth. Then, the free channels to be used are selected in a sequence from the target node to the start node, such that the routing path is established, and the requirement of the bandwidth is matched. The selection of the free channels is in accordance with a requirement of a shortest routing path, and the selected free channels to be used are different from those used by the adjacent nodes.

The present invention provides a distributed channel allocation method for a WMN. By the distributed channel allocation method, nodes that the routing path passes through are selected according to a routing path and a requirement of a bandwidth, and a start node and a target node are determined upon the selected nodes. In addition, a network flow and a flow direction from one node to another adjacent node are determined accordingly. The number of NICs on the nodes is selected according to the network flow and the flow direction. The free channels to be used are selected in a sequence from the target node to the start node, such that the routing path is established, and the requirement of the bandwidth is matched. Here, the selected free channels to be used are different from those used by the adjacent nodes.

The present invention provides a WMN system having a distributed channel allocation function. The WMN includes a plurality of nodes, and the distributed channel allocation includes firstly determining a free channel or a plurality of free channels between the adjacent nodes according to a channel utilization of the nodes. Next, the nodes which a routing path passes through are selected, and the free channels to be used are selected from the nodes on the routing path to establish the routing path, wherein the selection of the free channels is in accordance with a requirement of a shortest routing path, and the selected free channels to be used are different from those used by the adjacent nodes.

The present invention provides a WMN system having a distributed channel allocation function. The distributed channel allocation includes selecting nodes that a routing path passes through at first. Next, a free channel or a plurality of free channels between the adjacent nodes is determined according to a channel utilization of the nodes. Thereafter, the number of NICs on the nodes is adjusted according to a requirement of a bandwidth. After that, the free channels to be used are selected to establish the routing path, wherein the selection of the free channels is in accordance with a requirement of a shortest routing path, and the selected free channels to be used are different from those used by the adjacent nodes.

In order to make the aforementioned and other objects, features and advantages of the present invention comprehensible, several embodiments accompanied with figures are described in detail below.

DESCRIPTION OF EMBODIMENTS

Figure 1:
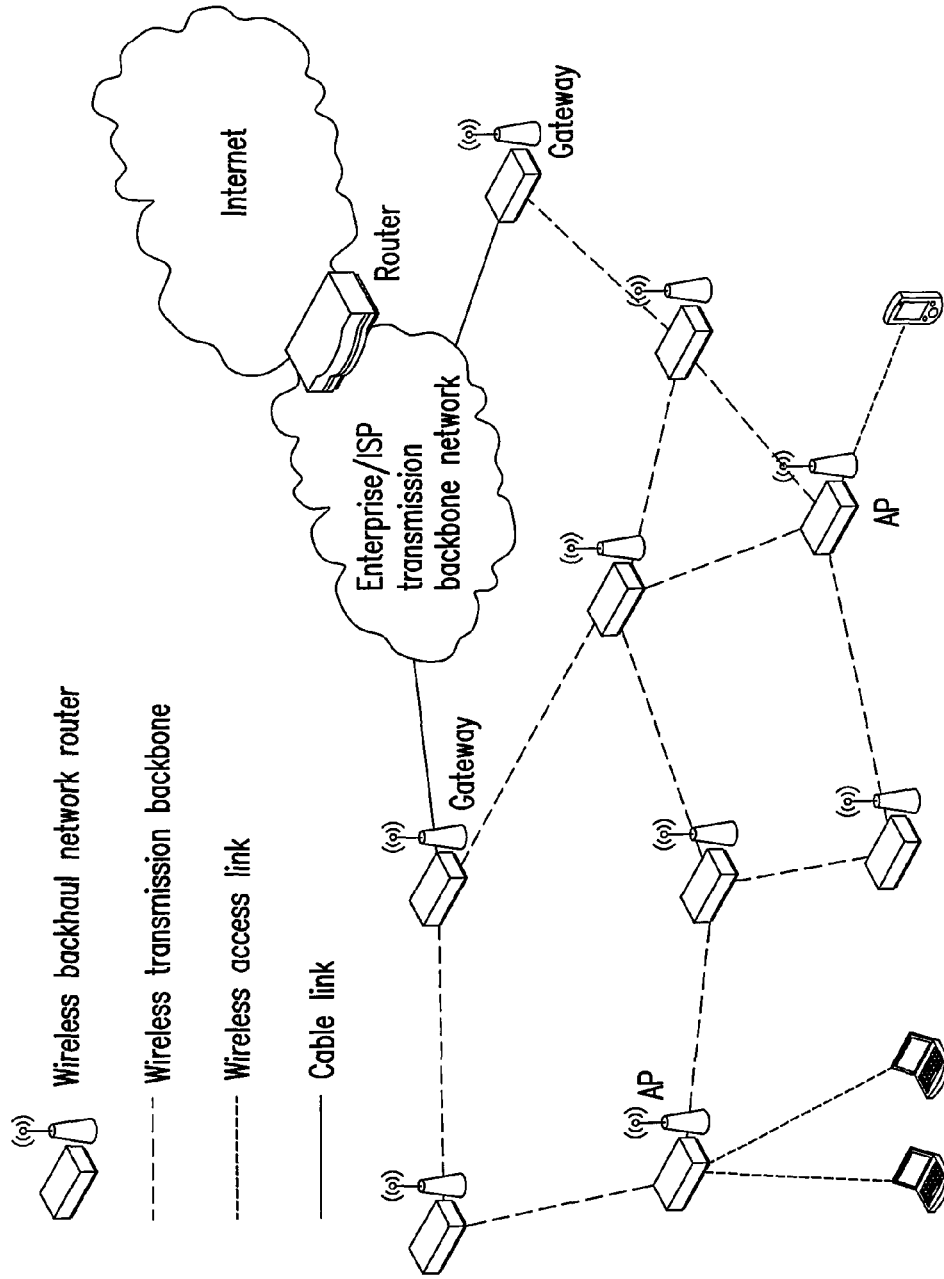
FIG. 1 is a schematic diagram of a conventional WMN.
Figure 2:
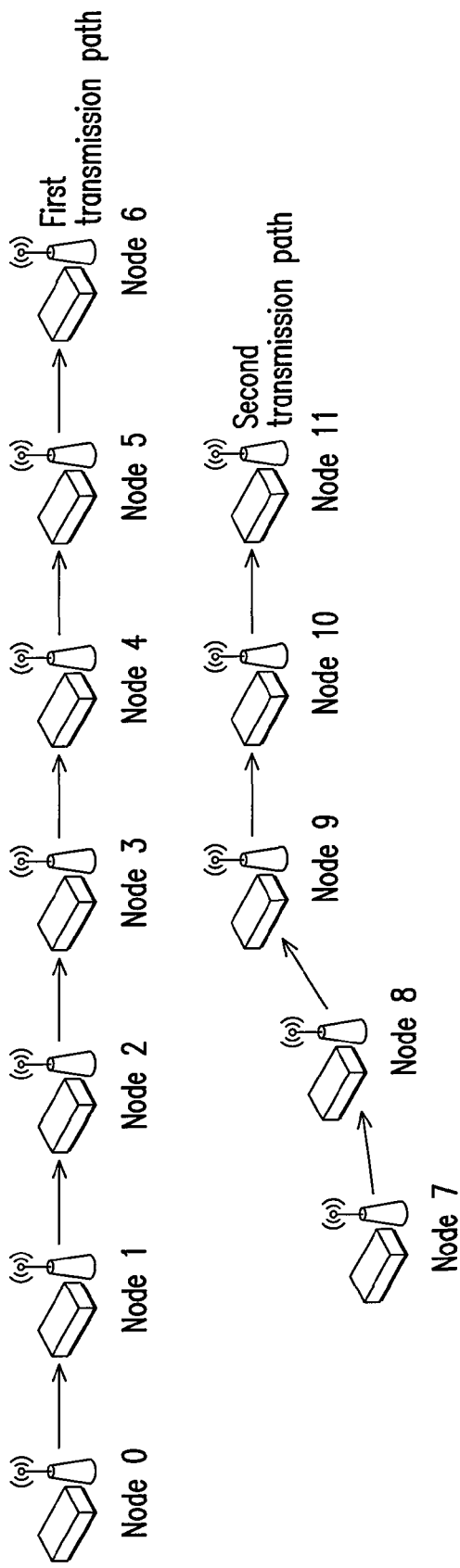
FIG. 2 is a schematic diagram illustrating problems of interferences in the same transmission path and in adjacent transmission paths of a conventional WMN link layer.

Definition of correlative terms:
R: a maximum distance at which a signal of a node in a network can be transmitted
D(u, v): a distance between a node u and a node v
C: a set of all non-overlapping channels in the network
G=(V, E): a directional graph G=(V, E) represents a Wi-Fi mesh network
V: a set of all nodes in the network
E: a set of all links in the network
$\forall u, v \in V, D(u,v)<R \Leftrightarrow (u,v) \in E \wedge (v,u) \in E$
$N_u \equiv \{x | \forall x, D(u, x)<R\}$: a set of the nodes within the signal coverage of the node u
S(u, k): a current state of a channel k of the node u, and the states include: transmitting (T), receiving (R), interfered (I) and free (F), wherein
  S(u, k)=T: represents that the node u is transmitting packets through the channel k
  S(u, k)=R: represents that the node u is receiving the packets through the channel k
  S(u, k)=I: $\exists x \in N_u, S(x, k)=T$ is interfered
  S(u, k)=F: S(u, k)≠T and S(u, k)≠R and S(u, k)≠I
$FC_{(u,v)}$: free channels on a link (u, v)
$\forall k \in C, k \in FC_{(u,v)} \Leftrightarrow S(u,k)=F/I$ and $S(v,k)=F$ and $\forall x \in N_u$, $S(x,k) \neq R$ If a three-tuple number is used for representing a free channel combination, its definition is provided as follows:

A known routing path is assumed to pass through n hops, and the hops are sequentially represented by $P_1, P_2, \ldots P_n$ from a start node to a target node. Here, $P_1, P_2, P_n \in E$
$FCS_{Px} \equiv \{(c_1, c_2, c_3) | c_1 \in FC_{Px-2}, c_2 \in FC_{Px-1}, c_3 \in FC_{Px}$ and $c_1 \equiv c_2 \equiv c_3\}, 3 \leq x \leq n$
$FCS_{P2} \equiv \{(-1, c_1, c_2) | c_1 \in FC_{P1}, c_2 \in FC_{P2}$ and $c_1 \neq c_2\}$
$FCS_{P1} \equiv \{(-2, -1, c_1) | c_1 \in FC_{P1}\}$ The present invention provides a wireless mesh network ("WMN") based on an IEEE 802.11s WiFi Mesh standard, having a channel allocation method combined with a time division technique and a spatial reusable technique. The channel allocation method may be a dynamic distributed channel allocation (referred to hereinafter as DDCA) method or a static channel allocation method. In any WMN under an arbitrary network topology, a plurality of nodes of a mesh network connects with one another, and the channel allocation method may be performed on each node. Channel allocation of each wireless link is calculated by a distributed approach. The time division technique allows the same channel which is repeatedly used in non-overlapping timeslots, and the spatial reusable technique allows the same channel which is repeatedly used over a distance in space. The above two techniques combined with a plurality of wireless transmission interfaces allowed to use different non-overlapping channels synchronously may improve the working efficiency of a transmission bandwidth.

Suitable non-overlapping channels and reserved bandwidths may be dynamically allocated according to a requirement of any of different shortest routing paths in the present invention. The calculations can be performed independently by network nodes that the routing path passes through. Interferences in the same transmission path and in the adjacent transmission paths of the allocated channels can be avoided, and the effective bandwidth can be fully utilized. Since the interferences can be avoided according to the present invention, and excessive bandwidth depletion due to the interferences can be avoided, the present invention is suitable for the application of a QoS control.

A distributed channel allocation method for the WMN based on the IEEE 802.11s WiFi Mesh standard is provided in the present invention. According to the distributed channel allocation method combined with the time division technique and the spatial reusable technique, each network interface is divided into a plurality of transmission timeslots, and the same channel may be reallocated in the same timeslot over a suitable distance. A unique network interface may communicate with a plurality of the network interfaces, and the number of the network interfaces on a receiving terminal and a transmitting terminal are allowed to be asymmetric, such that the allocation of the network interfaces is more flexible.

According to the aforementioned methods, the number of network interface cards (NICs) on local nodes of the network can be reduced to improve the utilization of the network channels and the bandwidth. However, to achieve the time division effect, the nodes of the whole mesh network should have the synchronous timeslots. Thus, a common-NIC is disposed on each node of the network. All the common-NICs use the same channel to exchange information such as configuration of the channels and synchronization information with the adjacent nodes to ensure a correct channel allocation of each node and ensure each node starting and stopping transmission in a right time.

The transmission path established according to the above method may synchronously avoid the interferences in the same transmission path and in the adjacent transmission paths, such that the effective bandwidth can be fully utilized. Therefore, the present invention at least has the following features. (1) The common-NIC is deposited on each node of the network, and the common-NIC of every node uses the same channel to exchange information such as channels being used, channels to be allocated and time synchronization with the adjacent nodes. (2) The DDCA method is provided. This DDCA method assumes that the routing path is determined, and the channels to be used among the nodes which the routing path passes through are dynamically determined by exchanging information among the nodes on the routing path, such that the interferences in the same transmission path and in the adjacent transmission paths on the routing path can be avoided. During the channel selection, allocated channels and channels with sufficient remaining bandwidth should be selected in priority, considering the feature of making the most use of a common path, so as to reduce the depletion of applicable channels greatly. (3) The time division technique is applied for dividing the transmission time of the NIC on each node to effectively utilize the remaining bandwidth of each node. The time division technique ensures the adjacent nodes starting and stopping transmission in the right time, and ensures a communication between a unique NIC and a plurality of the NICs on different nodes. Accordingly, the waste of the bandwidth due to the allocation of a routing path having a less bandwidth requirement for the NIC on a certain node can be avoided. Moreover, since the unique NIC may communicate with a plurality of the NICs, it has the advantage that the number of the NICs on the adjacent nodes are allowed to be asymmetric, and the number of the NICs can be adjusted according to the bandwidth requirement of each network node, such that a preferable cost-to-benefit ratio can be achieved. (4) A static analysis algorithm is provided. Through the algorithm, a suitable number of the NICs on each node can be pre-calculated according to a possible network flow of each node, such that the efficiency of the network channel allocation is improved.

The present invention provides a channel allocation method for a mesh network having multi-wireless network interfaces. The DDCA method of multi-NICs based on the IEEE 802.11a/b/g WLAN standard and a WMN based on the IEEE 802.11s WiFi Mesh standard has at least the following features: (1) the channels to be used among the nodes are dynamically determined; (2) the allocation is performed by independent calculation of each node (i.e. a distributed structure); (3) the interferences in the same transmission path and in the adjacent transmission paths are avoided; (4) the common-NIC is disposed on each node for exchanging information with the adjacent nodes; (5) the time division technique is applied, by which a unique wireless NIC may communicate with a plurality of the wireless NICs, and the number of the NICs on a receiving node and a transmitting node is allowed to be asymmetric; and (6) the static analysis algorithm is applied, by which a suitable number of the NICs on each node can be pre-calculated according to the possible network flow of each node.

Figure 3:
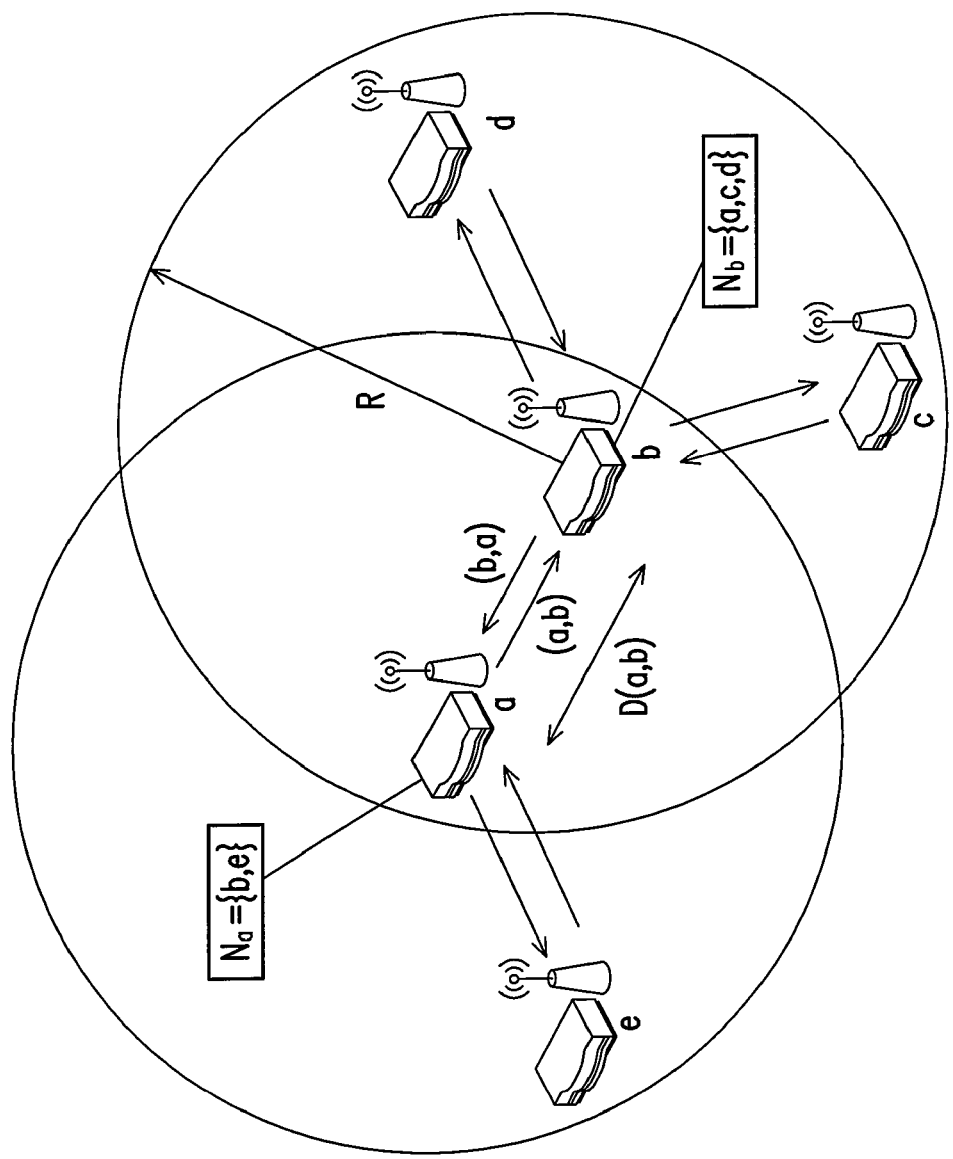
FIG. 3 is a diagram illustrating some definitions mentioned in an embodiment of the present invention.

Detailed methods for achieving the objectives of the present invention will be described below. Before the description, please refer to FIG. 3 for the definitions to be used in the embodiments of the present invention. Referring to FIG. 3, R represents a maximum distance that a transmission signal of the network nodes can reach. D(a, b) represents a distance between a node "a" and a node "b". $N_i=\{\}$ represents a set of nodes within the signal coverage of a node i. For example, $N_a=\{b, e\}$ represents the nodes within the signal coverage of the node a including the node b and the node e; and $N_b=\{a, c, d\}$ represents the nodes within the signal coverage of the node b including the node a, the node c and the node d. (a, b) represents there is a link between the node a and the node b.

Figure 4:
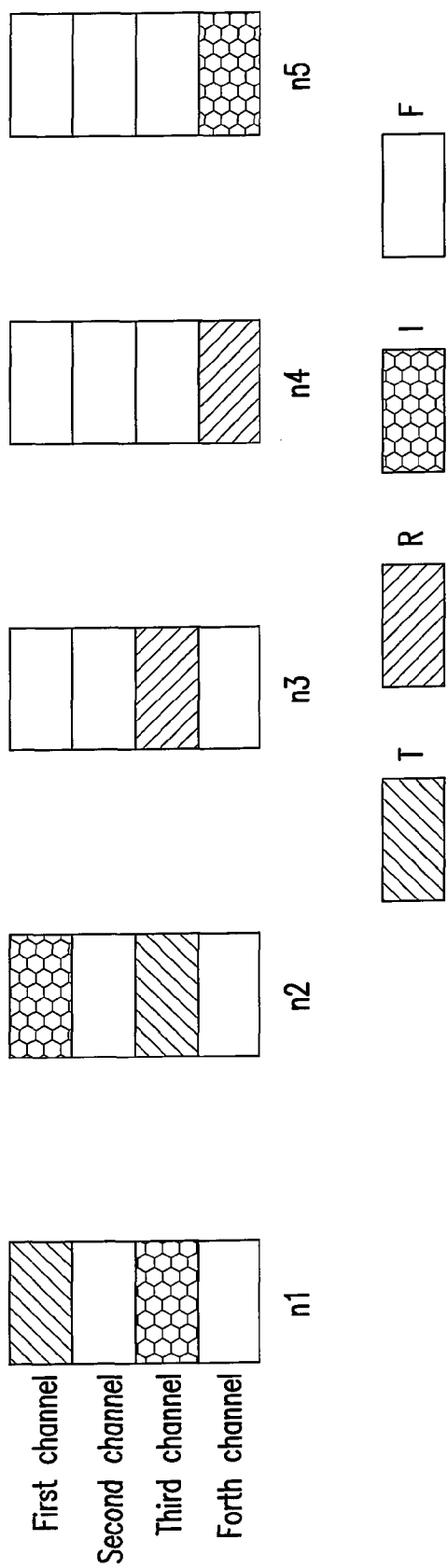
FIG. 4 is a schematic diagram illustrating a channel allocation method according to an embodiment of the present invention without a time division technique applied thereto.

First, definitions are explained with reference of an example illustrated in FIG. 4. In this example, the time division technique is not applied. The start node of the shortest routing path is assumed as n1, the target node is assumed as n5, and the nodes that the routing path passes through are assumed as n2, n3 and n4, and so on. Besides, given that there are a first, a second, a third and a fourth applicable non-overlapping channels, each node in the network records the present state of the corresponding channel, and there are four kinds of states: transmitting (referred to as "T"), receiving (referred as "R"), interfered (referred to as "I") and free (referred to as "F").

Assuming if the first channel of a node n1 is in a "T" state (shown by left-slanted lines), it represents the node n1 is transmitting packets through the first channel. Similarly, if the third channel of a node n3 is in an "R" state (shown in right-slanted lines), it represents the node n3 is receiving the packets through the third channel. If the third channel of the node n1 is in an "I" state (shown in cross lines), it represents a certain node within the signal coverage of the node n1 is transmitting the packets through the third channel, and the node n1 itself is not the receiving node. In the other situations, the applicable non-overlapping channels are in an "F" state (shown in blank).

Second, a free channel will be defined. The first channel of the nodes n1 and n2 in the "F" state reveals that the first channel of the node nil is in an "I" or "F" state and the first channel of the node n2 is in the "F" state, and the first channel of all the e nodes within the signal coverage of the node n1 is in a "T", "I" or "F" state. Therefore, if the node n1 and the node n2 have a first free channel, the node n1 may send the packets to the node n2 through the first free channel (not applicable to a reverse direction) without interfering with other nodes. The states of the adjacent nodes are obtained by exchanging information through the common-NIC.

Figure 5:
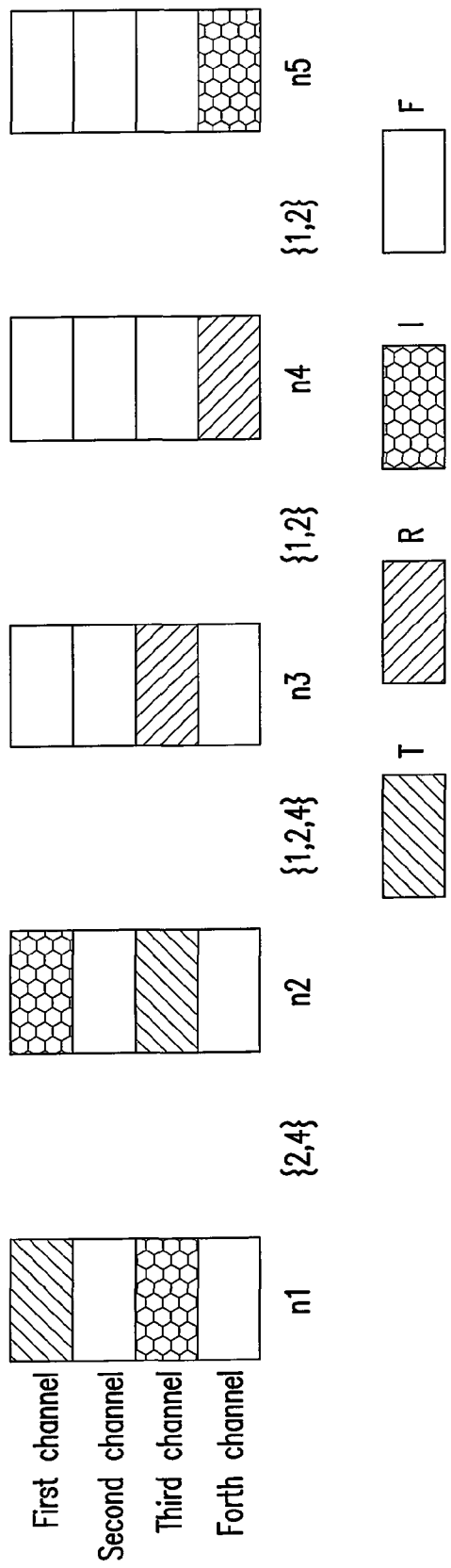
FIG. 5 is a schematic diagram illustrating free channels defined by a channel allocation method according to an embodiment of the present invention.

Therefore, referring to FIG. 5, suppose that there is no other node existing, the free channels between the node n1 and the node n2 will be the second channel and the fourth channel (shown as {2, 4} below) by calculation of each node, and the free channels between the node n2 and the node n3 will be the first channel, the second channel and the fourth channel.

The rest may be deduced by analogy. If being allocated, the free channels obtained by the aforementioned method will not interfere with any allocated channels in the network. Thus, the interference in the adjacent transmission paths is avoided.

First Embodiment

Basic Channel Allocation Method

First, a network structure with a single timeslot, four channels, and four NICs is taken for an example to explain the channel allocation method. Since there is only a single timeslot, an individual NIC can merely communicate with another NIC synchronously. Therefore, in this example, the number of the NICs on each node is assumed to be equal to the number of the non-overlapping channels.

Figure 6:
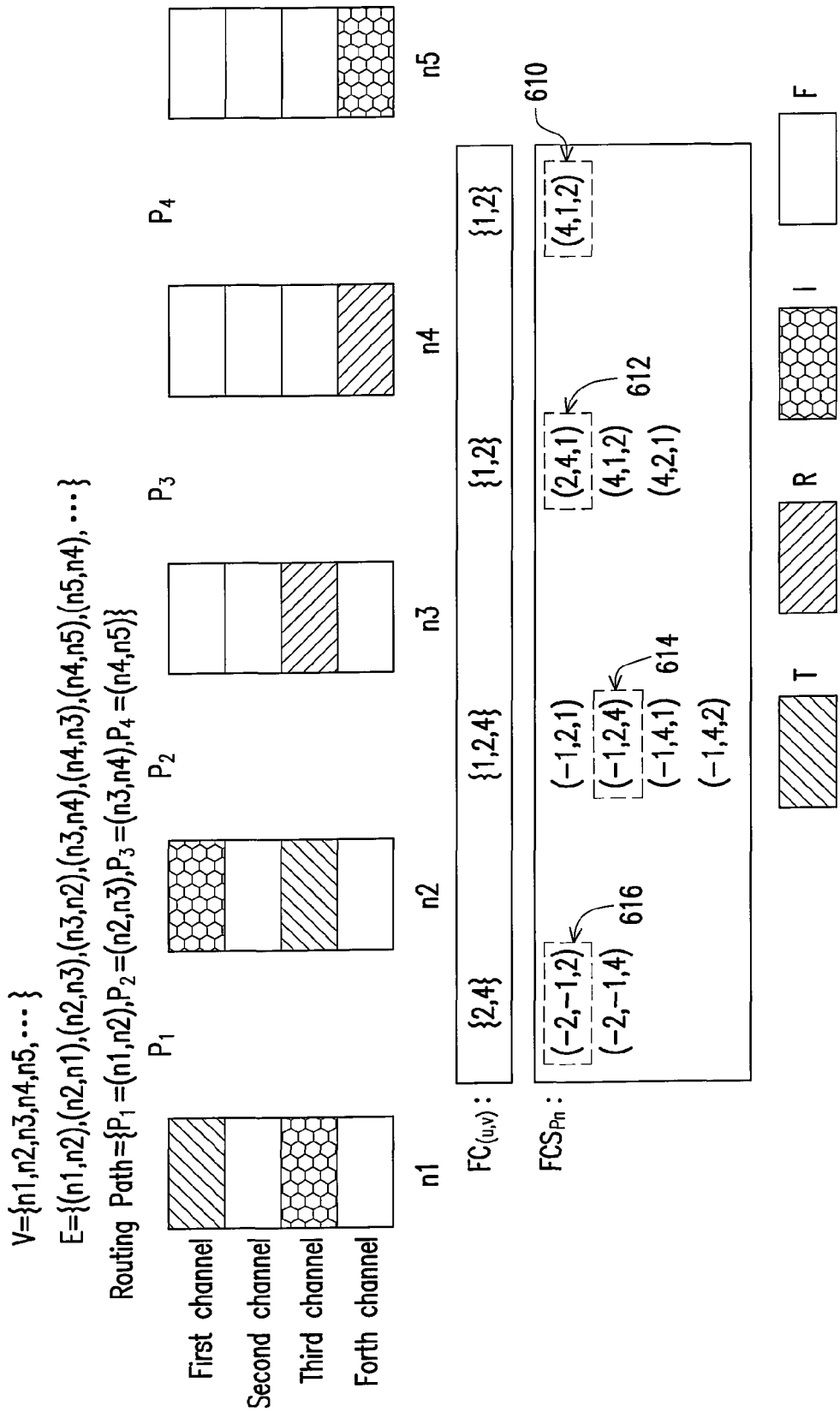
FIG. 6 is a schematic diagram illustrating a channel allocation method according to an embodiment of the present invention, wherein a triad (a1, a2, a3) is defined as a combination of correlative free channels.

First, a three-tuple (a1, a2, a3) is defined as a combination of correlative free channels, wherein a3 is the free channel of the present link, a2 is the free channel of the previous link, and a1 is the free channel of the previous two links. FIG. 6 is a calculated result of FIG. 5. $FC_{(u,v)}$ represents the free channel from a node u to a node v, whereas $FCS_{Pn}$ represents a path selected by the three-tuple in the present embodiment.

The following formulas denote the definition of the free channel combination $FCS_{Pn}$:

$$FCS_{Pn} = \{(c_1, c_2, c_3) | c_1 \in FC_{Pn-2}, c_2 \in FC_{Pn-1}, c_3 \in FC_{Pn} \text{ and } c_1 \neq c_2 \neq c_3\}, 3 \leq n \leq 4$$

$$FCS_{P2} = \{(-1, c_1, c_2) | c_1 \in FC_{P1}, c_2 \in FC_{P2} \text{ and } c_1 \neq c_2\}$$

$$FCS_{P1} = \{(-2, -1, c_1) | c_1 \in FC_{P1}\}$$

The basic channel allocation method of the present invention will be described with reference to a routing path including four links $P_1$, $P_2$, $P_3$ and $P_4$ shown in FIG. 6. First, a random combination of the correlative free channels is selected from the $FCS_{P4}$, and the combination is assumed as $(c1_{P4}, c2_{P4}, c3_{P4})$. Next, a combination $(c1_{P3}, c2_{P3}, c3_{P3})$ is selected from the $FCS_{P3}$ randomly, satisfying the conditions $c2_{P3}=c1_{P4}$ and $c3_{P3}=c2_{P4}$. Last, the channels are inversely selected in sequential from $FCS_{P4}$ to $FCS_{P1}$. Namely, the channels are selected from a last link of the routing path to a first link of the routing path. If the whole selection is successful, the channel allocation of the whole routing path is $c3_{P1}$, $c3_{P2}, \ldots, c3_{P4}$.

Referring to FIG. 6, the link $P_1$ between the nodes n1 and n2 has two sets of free channel combinations (−2, −1, 2) and (−2, −1, 4). Since the free channels between the nodes n1 and n2 are 2 and 4, and this link is the first link of the routing path, a column a1 is represented by "−2" and a column a2 is represented by "−1". The link $P_2$ between the nodes n2 and n3 has four sets of the free channel combinations obtained by matching the two sets of the free channels of the previous link with the free channels of the present link, wherein only the non-repeated combinations are reserved (the non-repeated free channels are selected from a1, a2 and a3).

Figure 7:
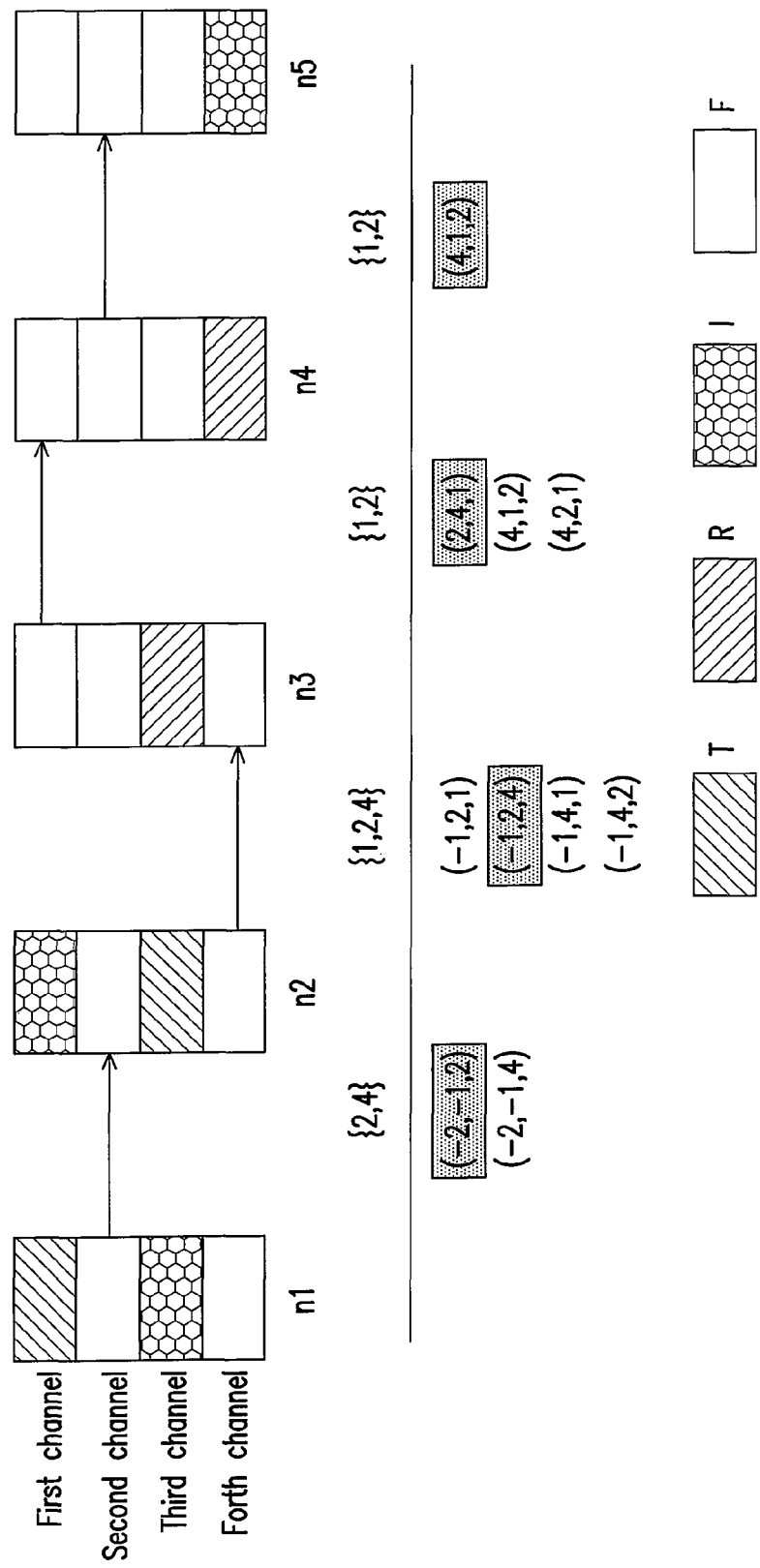
FIG. 7 is a selection result of an established routing path according to the channel allocation method shown in FIG. 6.

Last, selection of the channels starts from the last link $P_4$. Referring to FIG. 6, since there is only one free channel combination (4, 1, 2) available between the node n4 and the node n5, this combination is the only choice. Selection of this combination represents the second channel is selected between n4 and n5 (since a3 is 2). On the other hand, since a1 is 4 and a2 is 1, the free channel combination (2, 4, 1) has to be selected by the link between the nodes n3 and n4. After the free channel combination (2, 4, 1) is selected between the node n3 and the node n4, the free channel combination (−1, 2, 4) has to be selected by the link between the node n2 and the node n3. After the free combination (−1, 2, 4) is selected between the node n2 and the node n3, the free channel combination (−2, 1, 2) has to be selected by the link between the node n1 and the node n2. By this selection method, the selection result of the routing path of FIG. 7 is obtained from 610, 612, 614 and 616 in sequence as shown in FIG. 6, in which the selection result is illustrated as path arrows in an upper part of FIG. 7 and as grey areas in a lower part of FIG. 7.

Since there is a requirement of a shortest routing path, as long as there is no repetitive channel used within three hops, the allocated channels on the routing path will not interfere with each other. Thus, the interference in the same transmission path is avoided by applying the channel allocation method of the present embodiment.

The Second Embodiment

Sharing The Allocated Transmission Path by Distribution in Priority

Figure 8:
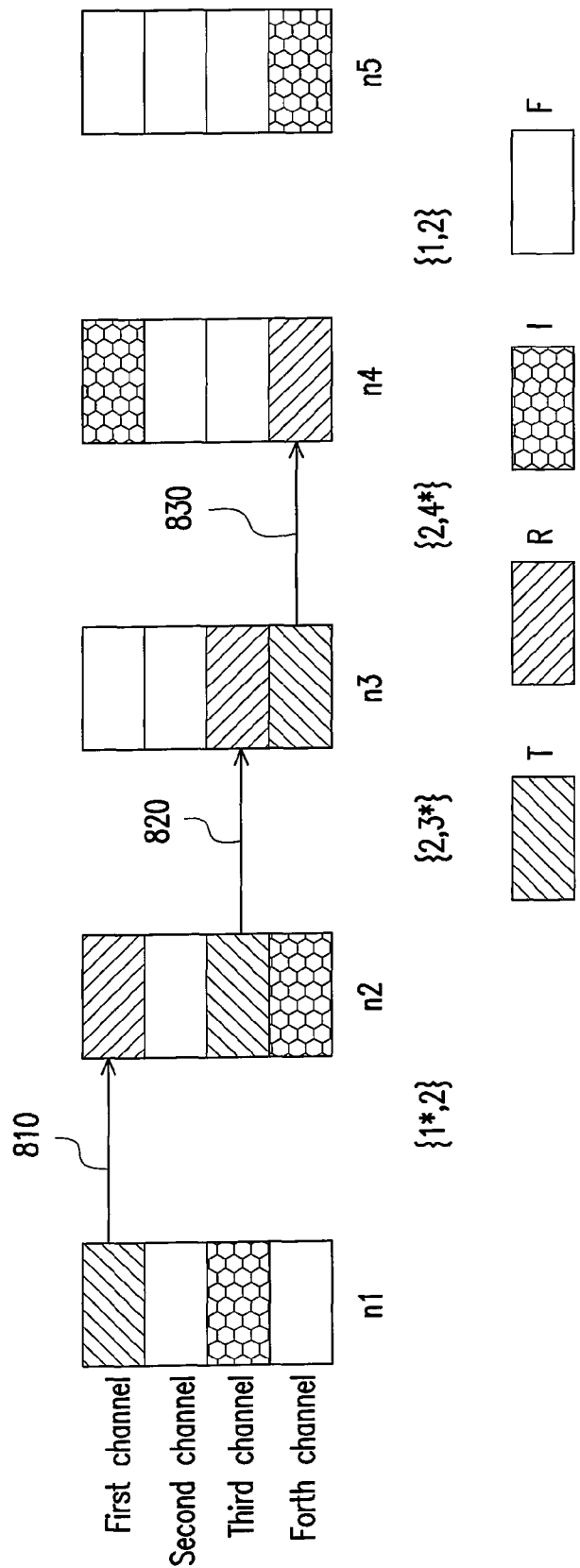
FIG. 8 is a schematic diagram illustrating a channel allocation method according to an embodiment of the present invention, wherein an allocated transmission path is shared.

To expanding the method of the first embodiment, a further embodiment is provided, wherein the allocated transmission paths can be shared according to the channel allocation method of the present invention, and the utilization efficiency of the network can be greatly improved. FIG. 8 represents a modified FIG. 4. Besides, it is assumed that the allocated channels already exist between nodes n1 and n2, nodes n2 and n3, nodes n3 and n4, and that the channels are transmitting packets, shown as arrows of reference numerals 810, 820 and 830. Referring to FIG. 8, a first channel is already allocated between the nodes n1 and n2, a third channel is already allocated between the nodes n2 and n3, and a fourth channel is already allocated between the nodes n3 and n4. If the remaining bandwidth of the allocated channels is greater than the bandwidth required for the routing path to be established, the allocated channels may be put into a list of the free channels.

Figure 9:
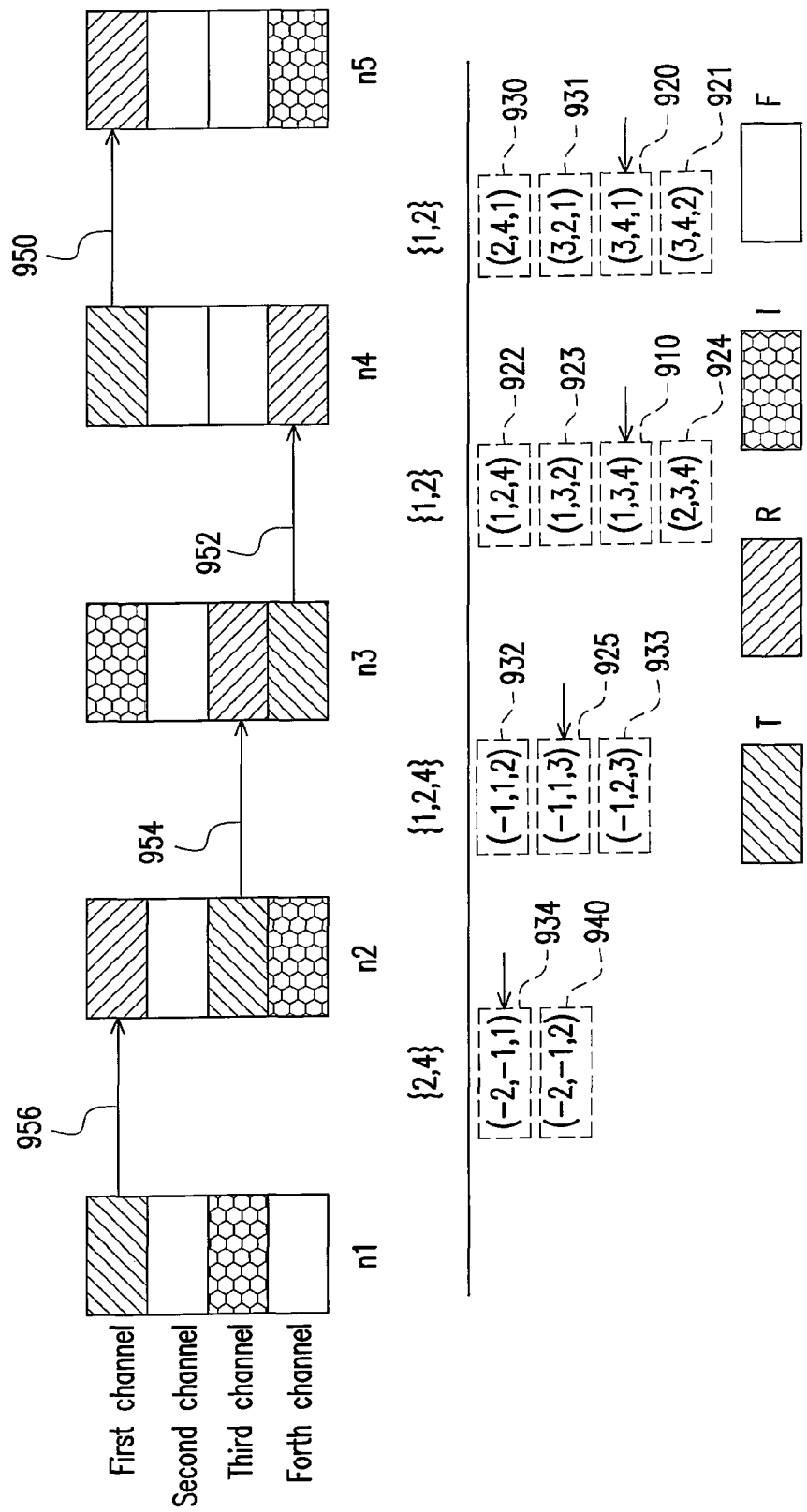
FIG. 9 illustrates an embodiment of the free channel combinations obtained based on the calculation of the information in FIG. 8.

An embodiment of free channel combinations shown in FIG. 9 is obtained based on the calculation of information disclosed in FIG. 8. In the present embodiment, according to the existence or non-existence of the allocated channels and the routing path to be established, the reference numeral 910 of FIG. 9 is set in a top priority level 3, the reference numerals 920, 921, 922, 923, 924 and 925 are set in a senior priority level 2, the reference numeral 930 is set in a junior priority level 1, and the reference numeral 940 is set in no priority level.

Therefore, during the channel allocation between the nodes n4 and n5, one of the combinations (3, 4, 1) and (3, 4, 2) will be selected considering the priority. Assuming that the combination (3, 4, 1) is selected by the link between the nodes n4 and n5, the combination (1, 2, 4) will be selected by the link between the nodes n3 and n4, the combination (−1, 1, 3) will be selected by the link between the nodes n2 and n3, and the combination (−2, −1, 1) will be selected by the link between the nodes n1 and n2. Thus, the channel allocation result will be shown as the arrows of the reference numerals 950, 952, 954, 956 in FIG. 9.

The Third Embodiment

Channel Allocation Method of Multi-Timeslots, Multi-Channels And Unique NIC

Another feature of the present invention will be described in the present embodiment. A time division technique is introduced to the previous channel allocation method, by which the number of the NICs on the receiving node and the transmitting node are allowed to be asymmetric. A situation of three timeslots, four non-overlapping channels and one NIC for each node is taken for an example to describe the channel allocation method of the present invention.

Figure 10:
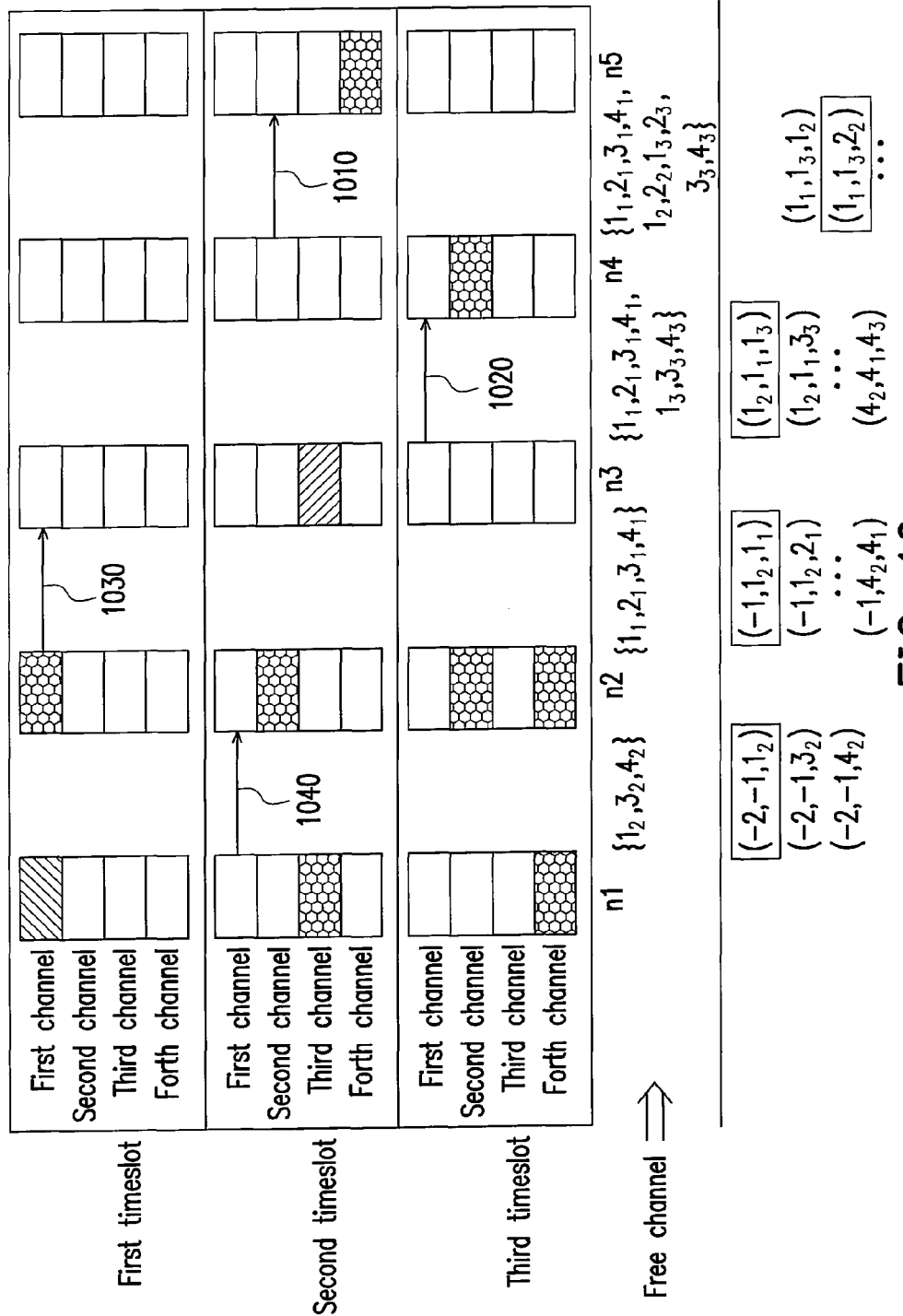
FIG. 10 is a schematic diagram illustrating a channel allocation method according to an embodiment of the present invention with a time division technique applied thereto.
Figure 11:
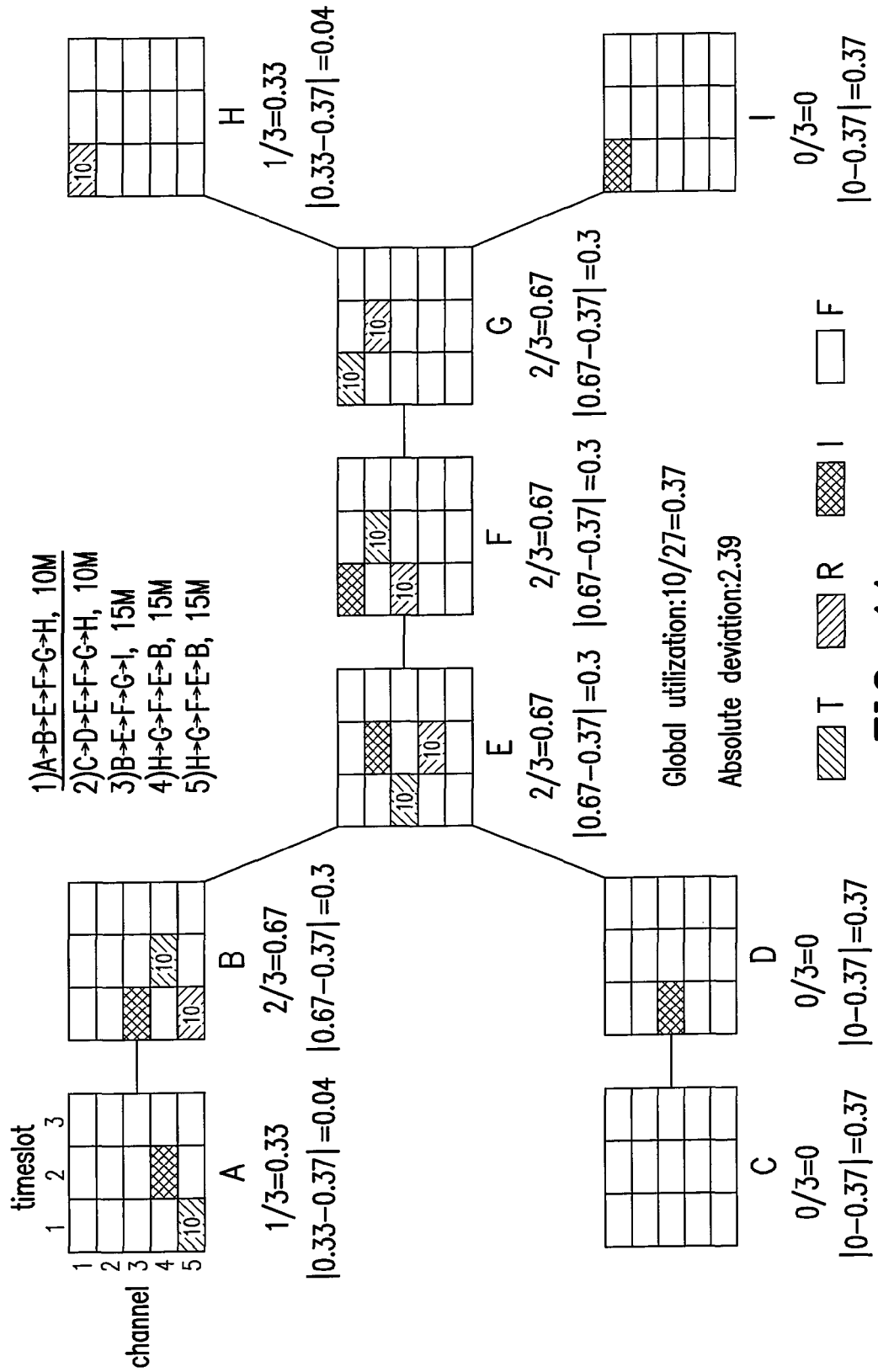
FIGS. 11-12 are schematic diagrams illustrating a possible network flow of each node obtained by summing up bandwidths of five respectively established routing paths according to a channel allocation method of the present invention.

Referring to FIG. 10, it should be noted that the channel utilization is categorized into four states: transmitting (T), receiving (R), interfered (I) and free (F). In FIG. 11, the "T" state is shown by left-slanted lines, which represents the channel is transmitting packets. The "R" state is shown by right-slanted lines, which represents the channel is receiving the packets. The "I" state is shown by cross lines, which represents a certain node within the signal coverage of the present node is transmitting the packets through the present channel, and the present node itself is not the receiving node. In the other situations, the channel utilization is in the "F" state and is shown in blank in the figure.

Since the time division technique is applied to the embodiment illustrated in FIG. 10, the free channel has to be redefined. Assuming that the first channel of a first timeslot between the nodes n1 and n2 is a free channel, namely, the total number of the "T" state and the "R" state of other channels (besides the first channel) between the nodes n1 and n2 should be less than the number of NICs disposed on the node (less than 1 in the present embodiment) in the first timeslot, and the state of the first channel of the node n1 is "I" or "F", the state of the first channel of the node n2 is "F", and the state of the first channel of all nodes within the signal coverage of the node n1 is not "R".

If $I_j$ is used for representing a channel I of a timeslot j, referring to FIG. 11, there are three free channels $1_2$, $3_2$, and $4_2$ between the nodes n1 and n2, four free channels $1_1$, $2_1$, $3_1$, and $4_1$ between the nodes n2 and n3, seven free channels between the nodes n3 and n4, and ten free channels between the nodes n4 and n5. By applying the aforementioned basic method, the allocated channels may avoid the problems of the interferences in the same transmission path and in adjacent transmission paths.

During the channel allocation between the nodes n4 and n5, if the combination ($1_1$, $1_3$, $2_2$) is selected, the combination (−1, $1_2$, $1_1$) will be selected by the link between the nodes n2 and n3, and the combination (−2, −1, $1_2$) will be selected by the link between the nodes n1 and n2. Thus, the channel allocation result will be shown as arrows of reference numerals 1010, 1020, 1030 and 1040 in FIG. 10.

The Fourth Embodiment

Channel Allocation Method for Asymmetric Number of NICs

A more complicated situation for channel allocation of a dynamic network will be described below with reference to FIG. 11. The distribution of a network topology shown in FIG. 11 is a common used WMN structure. It is assumed that the transmission time is divided into three timeslots, and that there are five non-overlapping channels in which each node has only one NIC. Besides, given that the maximum bandwidth of each timeslot is 54M, the five sequentially established routing paths are:

(1) A→B→E→F→G→H, 10M bandwidth required.
(2) C→D→E→F→G→H, 10M bandwidth required.
(3) B→E→F→G→I, 15M bandwidth required.
(4) F→E→D→C, 30M bandwidth required.
(5) H→G→F→B, 15M bandwidth required.

Initially, the channel state of all nodes is F. Therefore, after the allocation of the routing path (1) is performed, the allocation result is shown in FIG. 11. Numbers in the block represent the bandwidth reserved for transmitting the routing path by the present allocated channels. The definition of the parameters "global utilization", "node utilization", and "absolute deviation" indicated in the figure will be described as follows. It is assumed that |V| is n, and V is a set of all nodes in the network. Moreover, T represents the number of the timeslots divided, which is assumed to be k, and T>0. In addition, $I_x$ represents the number of the NICs on the node x, and $U_{x,t}$ represents the number of the allocated channels on the node x at the t-th timeslot, wherein $U_{x,t} \leq I_x$ and $0 < t \leq T$.

Node Utilization ($Nu_x$):

$$\frac{\sum_{t=1}^{k} U_{x,t}}{I_x \times k},$$

wherein x∈V.

Global Utilization (GU):

$$\frac{\sum_{x=1}^{n} \sum_{t=1}^{k} U_{x,t}}{\left(\sum_{x=1}^{n} I_x\right) \times k},$$

wherein x∈V.

Absolute Deviation:

$$\sum_{x=1}^{n} |NU_x - GU|.$$

Referring to FIG. 11, the global utilization (GU) is 0.37, and the absolute deviation is 2.39. For example, the node utilization of a node A is ⅓=0.33, having 0.04 difference from the GU. The node utilization of a node B is ⅔=0.67, having 0.3 difference from the GU. The node utilization of other nodes is shown in FIG. 11, and thus the repeated parts will be omitted herein.

Figure 12:
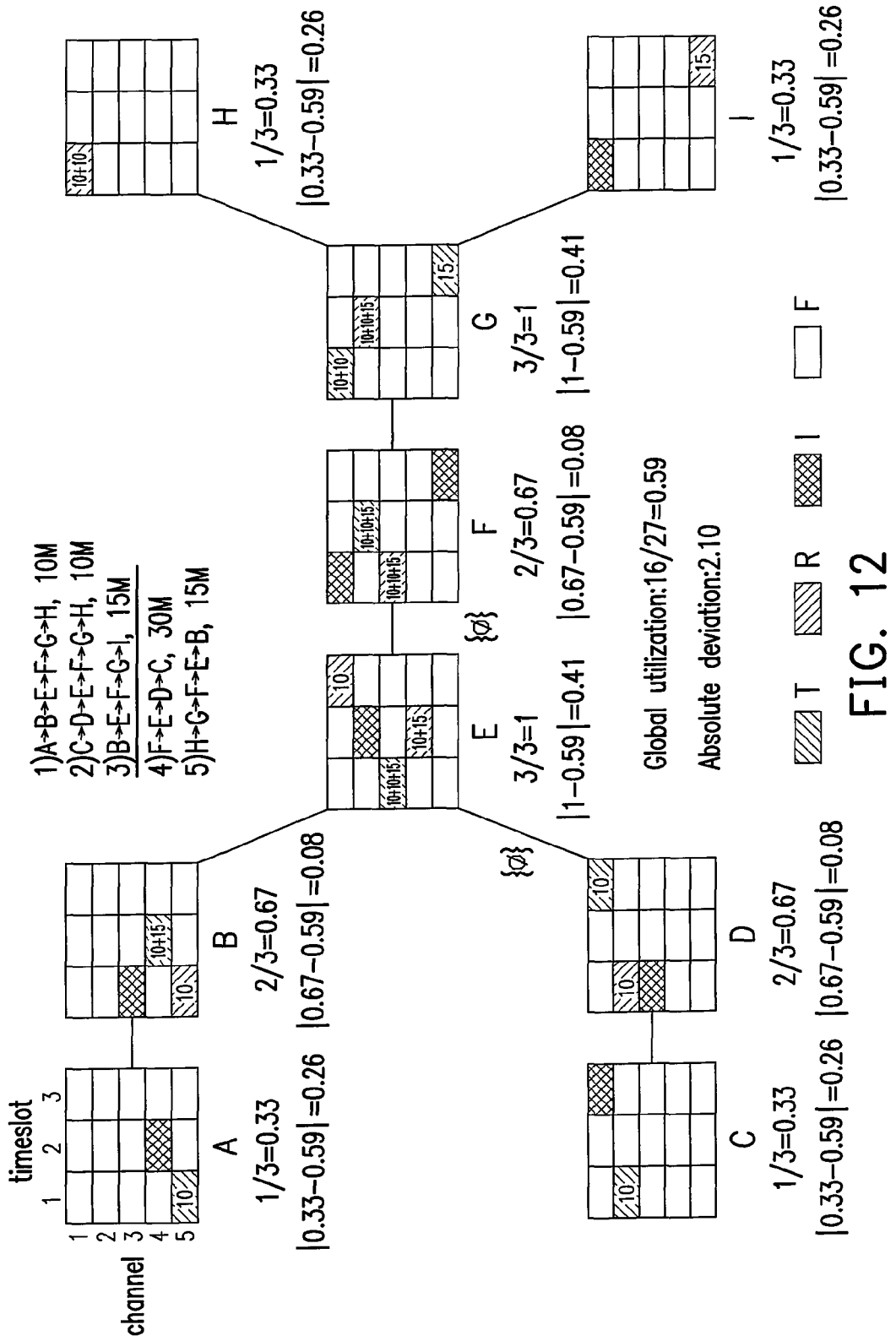

Referring to FIG. 12, the allocations of the routing paths (1) to (3) have been performed, and the allocation of the routing path (4) is undertaking. However, the routing path (4) has a reverse transmitting direction in comparison with the routing paths (1) to (3), and therefore the allocated channels cannot be shared. Furthermore, when a new channel is about to be allocated, only D→C has remaining free channels, whereas F→E and E→D have no free channel available (shown as empty set {Ø}). Hence, the establishment of the routing path (4) will fail. From this example, it is known that the channels and the bandwidths on the common path E←→G are consumed more quickly than those on an end path C←→D. Even if there are free channels or bandwidths available on the end path, it is still useless due to exhaustion of the free channels or the bandwidths on the common path.

Figure 13:
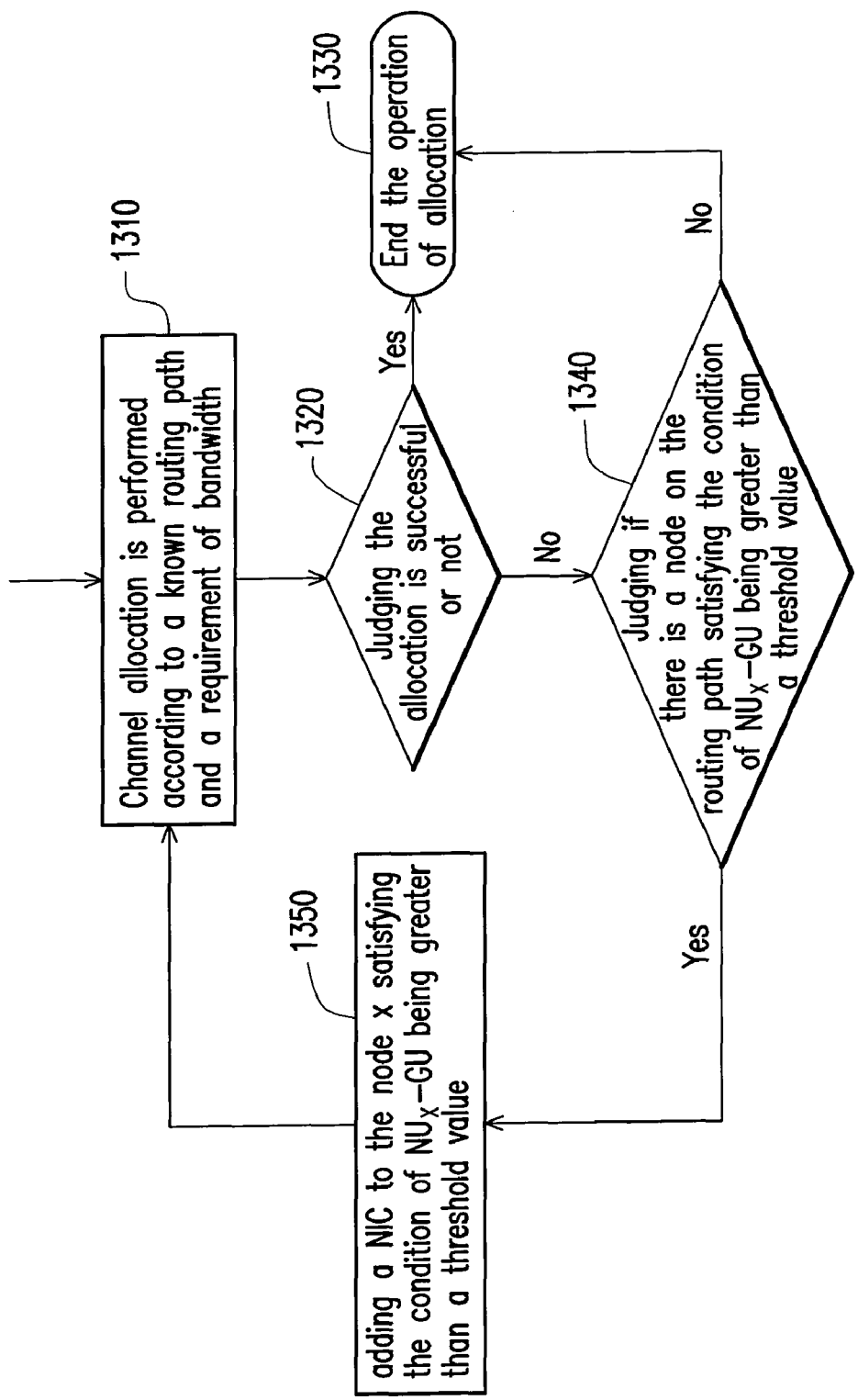
FIG. 13 is a schematic flowchart illustrating a method of adjusting the whole network flow by increasing the number of NICs.

However, the channel allocation method of the present embodiment has the feature of an asymmetric number of the NICs on the receiving node and the transmitting node. Thus, as long as the number of the NICs on the nodes where the free channels or the bandwidths are consumed quickly is increased, the utilization rate of the free channels and the bandwidths will be greatly improved, and the whole network flow will be improved accordingly. Please refer to FIG. 13 which is a flowchart illustrating a method of adjusting the whole network flow by increasing the number of the NICs. First, in step 1310, a channel allocation is performed according to a known routing path and a requirement of a bandwidth. Next, in step 1320, the above channel allocation is judged to be successful or not. If the allocation is successful, going to step 1330 to complete the operation of allocation. If the allocation is unsuccessful, judging if there is a node on the routing path satisfying the condition that $NU_x$-GU is greater than a threshold value. Further, if the node exists, adding the NIC to the node x. If the node does not exist, going to step 1330 to complete the operation.

Figure 14:
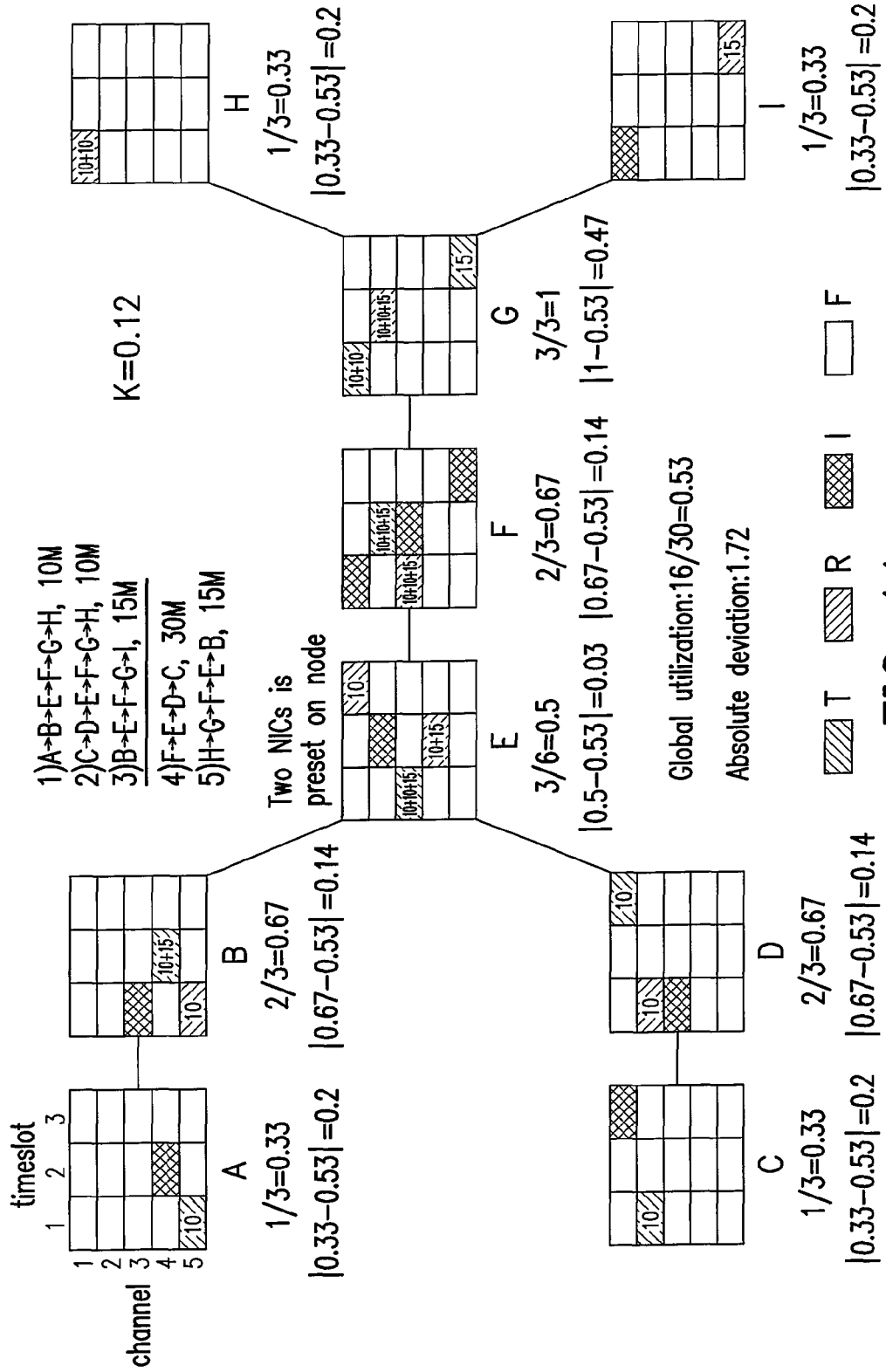
FIGS. 14-16 are schematic diagrams illustrating a possible network flow of each node obtained by summing up the bandwidths of the five respectively established routing paths after the NICs are added according to FIG. 13.
Figure 15:
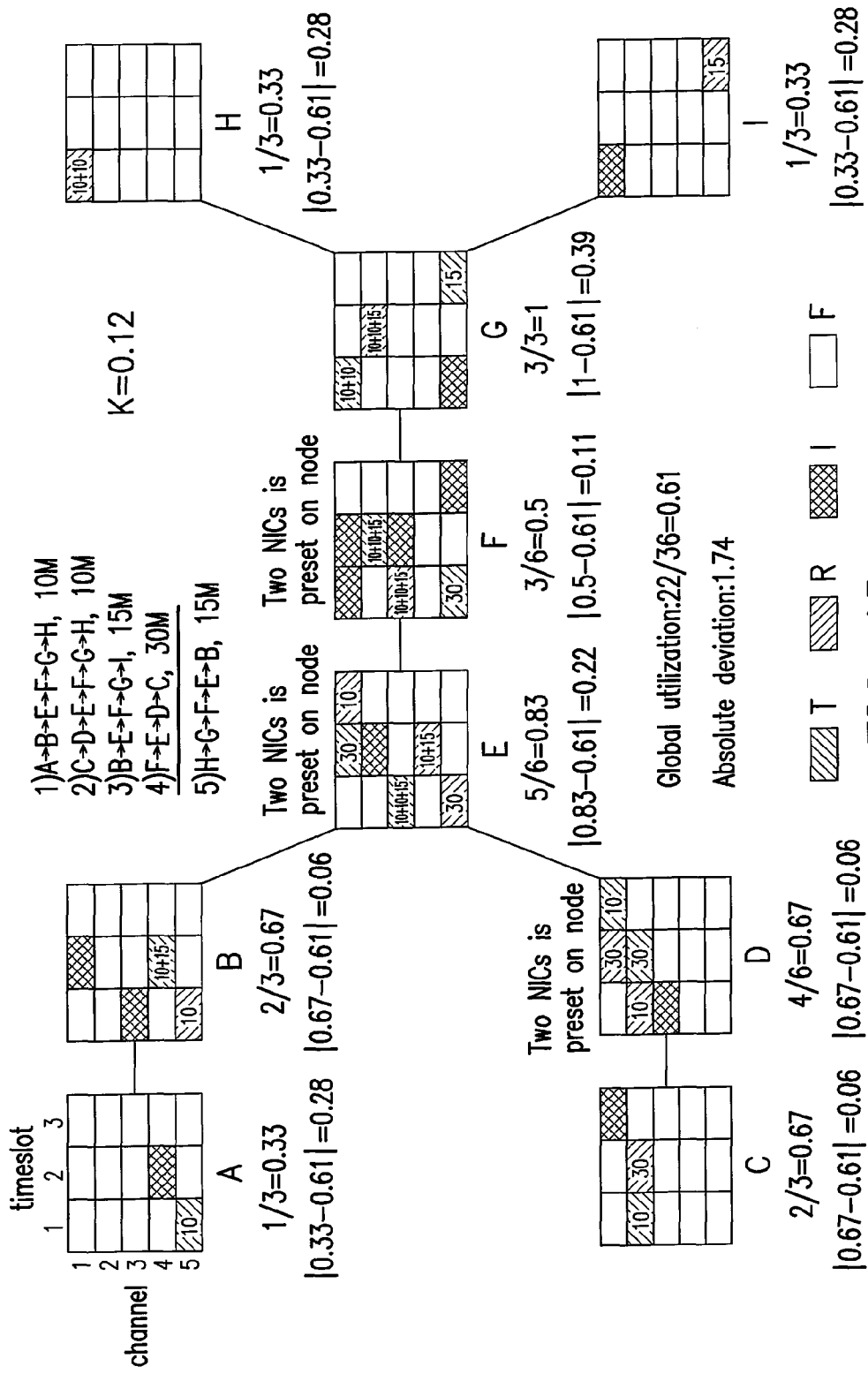
Figure 16:
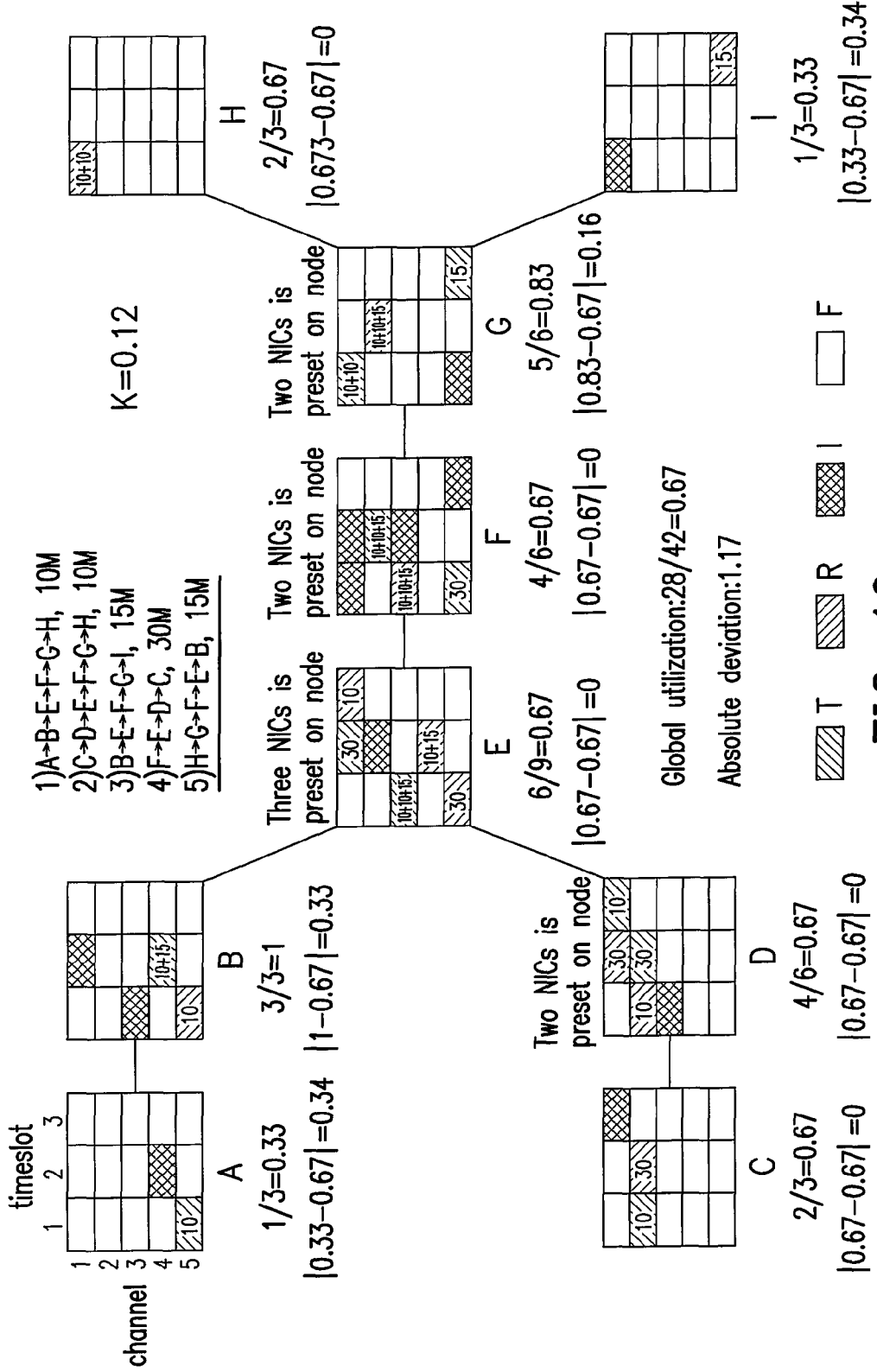

In FIG. 14, one NIC is added to a node E, and the situation of no free channel available {Ø} on E→D of the node E will not exist. Here, the node utilization is ⅗=0.5. In FIG. 15, one NIC is added to the nodes D and F, respectively. In FIG. 16, one NIC is added to the nodes D and F, respectively. Finally, the routing paths (4) and (5) can be successfully allocated.

In the aforementioned embodiment, the channel allocation method for the mesh network having the wireless network interface is provided, such that the interference among the nodes can be avoided, and the bandwidth is guaranteed.

The previous description provides the dynamic analysis method, by which the routing paths and the bandwidth requirement are respectively established according to the dynamic method, and the number of the NICs required on each node is analyzed. In the dynamic analysis of the present invention, the node utilization and the global utilization are respectively defined. Given that the routing paths and the bandwidth requirement are respectively established, and that the allocation fails, the nodes on the present routing path are scrutinized to find if a difference between the node utilization and the global utilization is greater than a certain threshold value. Moreover, one NIC is added to each node, and the routing path is then reallocated. By adjusting different threshold values, the channel utilizations of the whole network and a blocking rate of the allocation are affected. Therefore, the dynamic analysis may gradually simulate the effects of the network under the different threshold values.

However, to establish the network, a suitable number of the NICs on each node should be pre-calculated according to the possible network flow of each node, in spite of the fact that the dynamic analysis method cannot provide such information. Thus, a static analysis algorithm is further provided in the present invention.

The Fifth Embodiment

Static Analysis Algorithm

Figure 17:
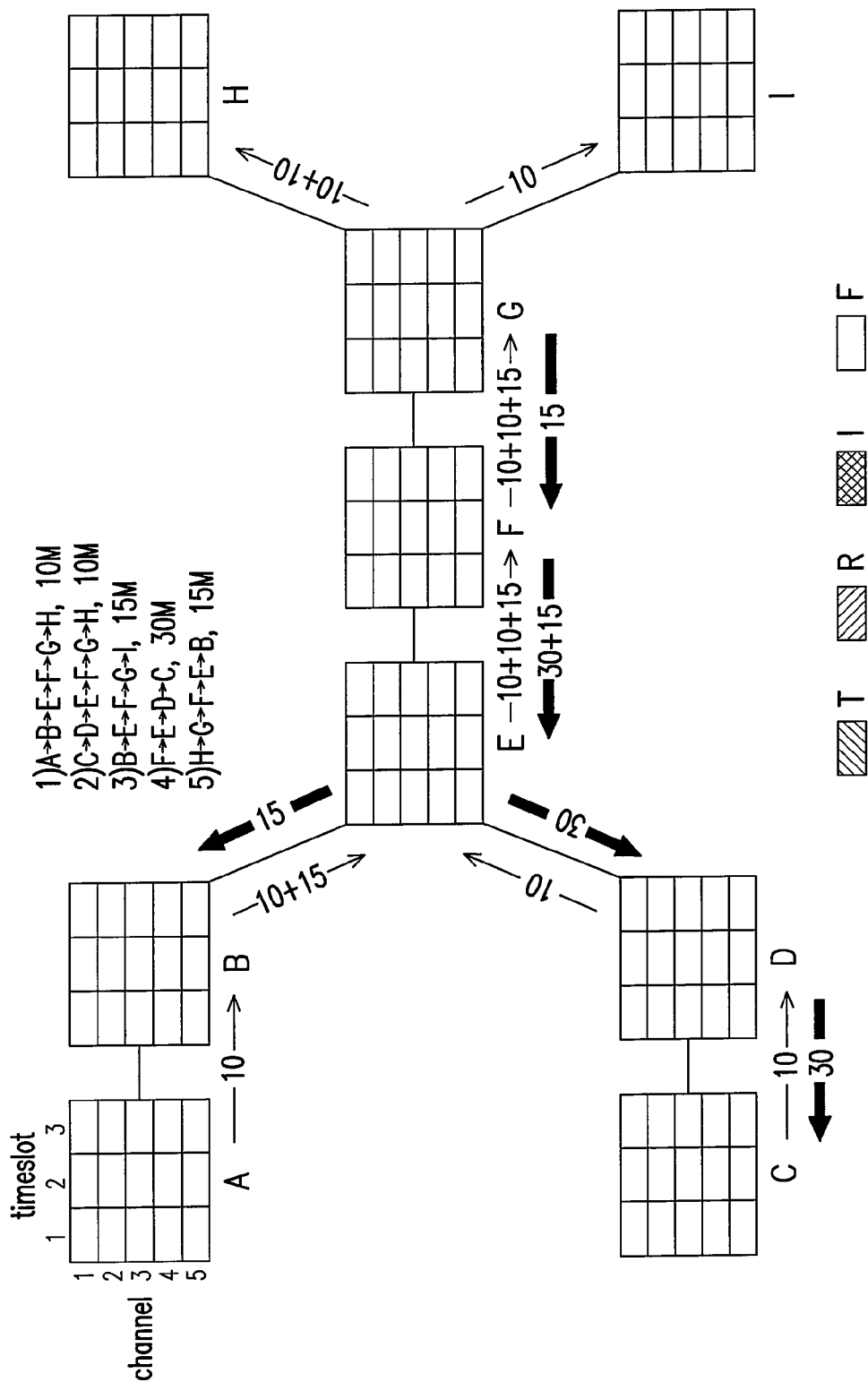
FIG. 17 is a schematic diagram illustrating a channel allocation method according to an embodiment of the present invention with a static analysis algorithm applied thereto.

The example shown in FIG. 11 is again taken for further demonstration. The bandwidths of the five respectively established routing paths are summed up and set to the possible network flow of each node. The network flow and flow directions from each node to the adjacent nodes are shown in FIG. 17, after the required bandwidth of the five routing paths are summed up. A network builder may draw a similar figure according to the service and the bandwidth to be provided. Next, the static analysis algorithm will be described below with reference to this network topology and the preset network flow.

Providing that the network topology is established as shown in FIG. 17, the network flow and the flow directions from each node to the adjacent nodes are shown by broad arrows and blue arrows in FIG. 17. There is no routing path information at present, and only the total network flow and the flow directions are recorded, wherein the recorded information can be shown in a table.

A flow table (FT) is defined herein. The preset flow and the flow directions from each node to the adjacent nodes are shown in table one. A cell on an i-throw and a j-th column in the table is represented by $FT_{ij}$, and its definition is given as below:

$FT_{ii}=0$, $\forall i \leq n$, wherein n is sum of all nodes in the network.

If $FT_{ij}>0$, it can be deduced that there is a preset flow from a node i to a node j (conversely, it also represents a total flow node j is received from node i).

Therefore, the information including the preset network topology and the flow directions in FIG. 17 are shown in table one. For example, the preset flow 45M (30+15 shown on broad arrow) from the node F to the node E shown in FIG. 17 can be represented by a number 45 located on the 6th row and the 5th column in table one.

TABLE ONE network flow table

| Node | A | B | C | D | E | F | G | H | I |
|------|---|---|---|---|---|---|---|---|---|
| A |   | 10 |   |   |   |   |   |   |   |
| B |   |   |   |   | 25 |   |   |   |   |
| C |   |   |   | 10 |   |   |   |   |   |
| D |   |   | 30 |   | 10 |   |   |   |   |
| E |   | 15 |   | 30 |   | 35 |   |   |   |
| F |   |   |   |   | 45 |   | 35 |   |   |
| G |   |   |   |   |   | 15 |   | 20 | 15 |
| H |   |   |   |   |   |   | 15 |   |   |
| I |   |   |   |   |   |   |   |   |   |

After the information of the preset flow and the flow directions is converted as indicated in table one, a minimum number of the NICs required on each node for satisfying the preset flow is calculated by the following formula. The design of the formula is based on the channel allocation method of the present invention. Since the channel allocation method of the present invention may effectively avoid the interference and has a feature of resource sharing, such a simple formula can be provided for accurately calculating the number of the NICs required on each node. As such, the network builder may have an efficient design of the network according to the service to be provided.

Formula (1) represents the number of the NICs required on any node i of the network:

$$\left\lceil \frac{\sum_{j=1}^{n}\left\lceil\frac{F_{ij}}{\frac{B}{T}}\right\rceil + \sum_{k=1}^{n}\left\lceil\frac{F_{ki}}{\frac{B}{T}}\right\rceil}{T} \right\rceil \qquad (1)$$

Where n is the sum of all nodes in network, B is the total bandwidth of the NICs, and T is the number of the timeslots divided on the NIC.

Formula (1) includes two main parts which will be independently introduced as formula (2) and formula (3). Formula (2) points out the minimum number of the timeslots required for satisfying the required bandwidth from the node i to all the adjacent nodes. Since the flow in different directions has to be independently transmitted in the different timeslots, the number of the timeslots required in a certain direction is obtained by performing an upper Gaussian operation. Namely, the total required bandwidth in a certain direction is divided by the bandwidth of an individual timeslot. Then, the sum of the required timeslots in all directions refers to the operation result of formula (2). Conversely, formula (3) is the minimum number of the timeslots required for satisfying the required bandwidth in the directions from all the adjacent nodes to the node i. Finally, the sum of formula (2) and formula (3) represents the total timeslots required for transmission and reception of the node I. Therefore, the minimum number of the NICs required on the node i is obtained by performing the upper Gaussian operation. That is to say, the total timeslots required are divided by the number of the timeslots divided.

$$\sum_{j=1}^{n}\left\lceil\frac{F_{ij}}{\frac{B}{T}}\right\rceil \qquad (2)$$

$$\sum_{k=1}^{n}\left\lceil\frac{F_{ki}}{\frac{B}{T}}\right\rceil \qquad (3)$$

Based on the above, the number of the NICs required on each node can be accurately presented in table two by calculating the information in table one with use of formula (1). In table two, it is assumed that a total bandwidth of all the NICs is 150M (parameter B), the number of the timeslots divided is three (parameter T), and the number of the NICs required on each node can be adjusted by adjusting a parameter B or a parameter T.

TABLE TWO the number of the NICs required on each node:

| | Node number | | | | | | | | |
|---|---|---|---|---|---|---|---|---|---|
| | A | B | C | D | E | F | G | H | I |
| Number of the NICs | 1 | 1 | 1 | 2 | 2 | 2 | 2 | 1 | 1 |

An embodiment of the static channel allocation method will be described below to demonstrate that the result of table two can assuredly satisfy the requirement of the bandwidth. The biggest difference between the static channel allocation and the aforementioned dynamic channel allocation lies in that the static channel allocation only needs the information of an inflow bandwidth, an outflow bandwidth, and the flow directions of each node, while the dynamic channel allocation is able to provide information of the whole routing path. Thereby, different from the dynamic channel allocation which is performed according to the new routing paths individually established, the static channel allocation is performed sequentially according to the inflow and the outflow bandwidths of each node from the highest to the lowest.

TABLE THREE sequence of static channel allocation

| Node | In-Out throughput | | Step sequence |
|---|---|---|---|
| | In | Out | |
| A | 0 | 10 | 8 |
| B | 25 | 25 | 5 |
| C | 30 | 10 | 7 |
| D | 40 | 40 | 4 |
| E | 80 | 80 | 1 |
| F | 50 | 80 | 2 |
| G | 50 | 50 | 3 |
| H | 20 | 15 | 6 |
| I | 15 | 0 | 9 |

Table three shows the sequence of the static channel allocation on each node, by which the channel allocation is performed sequentially according to the outflow bandwidth of each node from the highest to the lowest. If the outflow bandwidth stays unchanged, the inflow bandwidth will be taken into consideration, and the node having a greater inflow bandwidth has a priority. The column labelled as "step sequence" in table three represents an allocation sequence of the nodes. FIGS. 3 through 6 respectively indicate the allocated result of each node.

Figure 18:
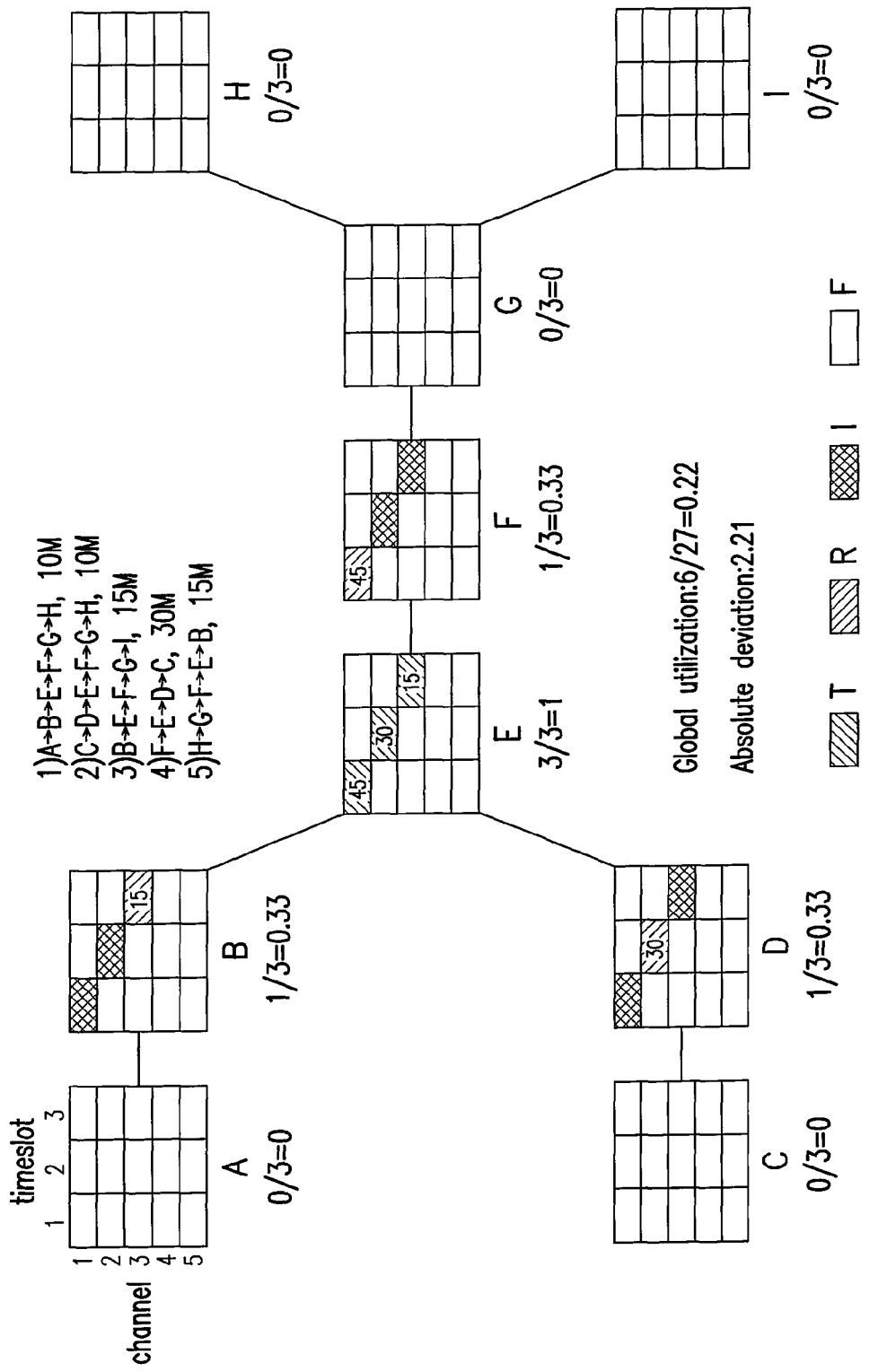
FIGS. 18-21 are schematic diagrams illustrating the steps of channel allocation according to a channel allocation method of the present invention with a static analysis algorithm applied thereto.

FIG. 18 is the channel utilization of each node after a step sequence 1 of the static allocation is done. According to table three, the step sequence 1 is performed on the node E, and during the allocation, only the outflow bandwidth of each node is taken into consideration. For example, the node E has three flow directions: (1) 15M to the node B, (2) 30M to the node D, and (3) 45M to the node F. The result is shown in FIG. 18 after the flow in different directions is allocated on the node E. Note that only one NIC is initially preset on each node. Moreover, the parameters B and T are set to 150 and 3, respectively, B is the total bandwidth of the NICs, and T is the number of the timeslots divided on the NIC. Thus, the outflow bandwidth of the node E can be successfully allocated in the case that only one NIC is presented.

Figure 19:
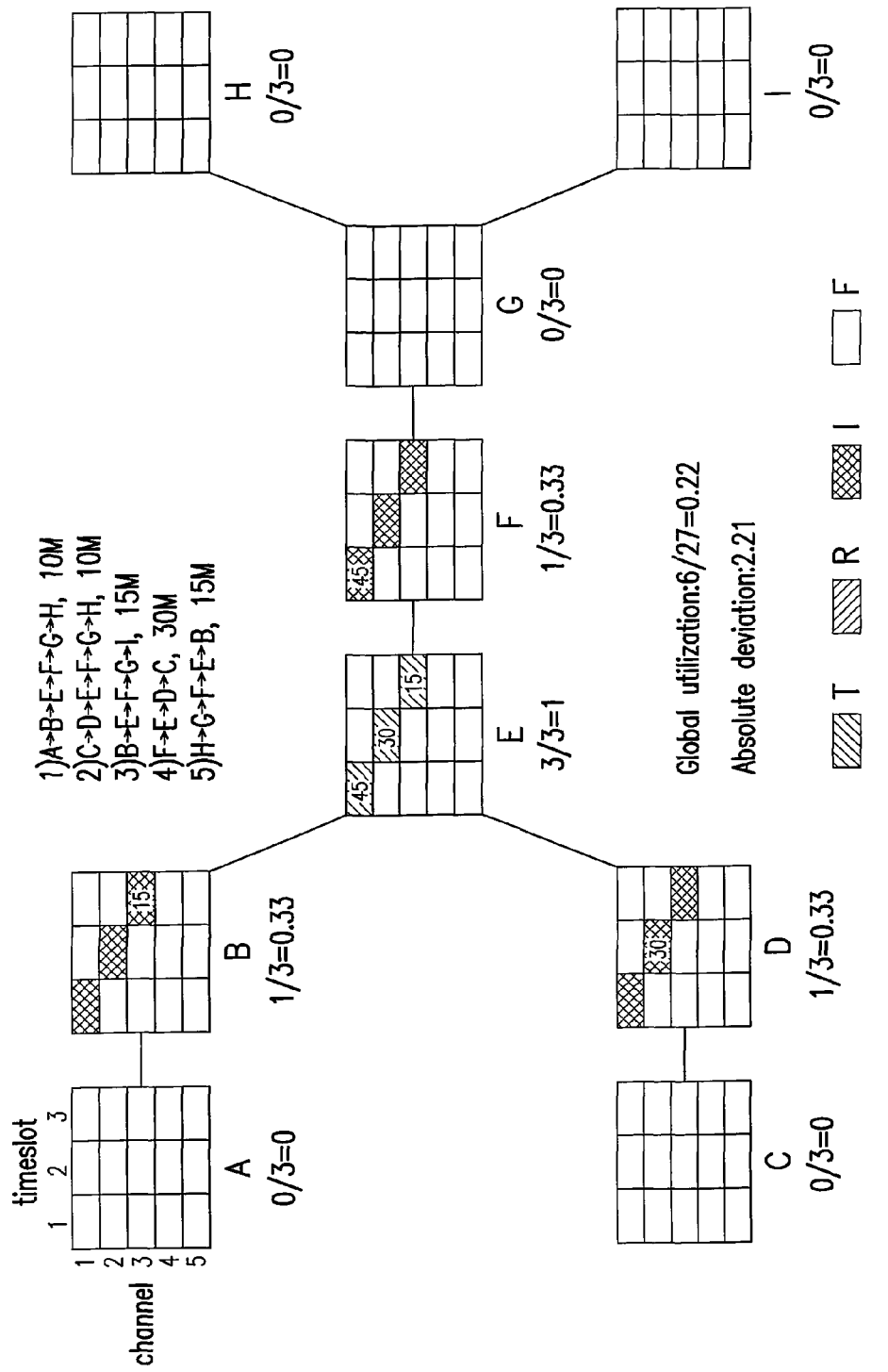

FIG. 19 shows the result after a step sequence 2 is performed. The node F on which the step sequence 2 is performed has two outflow bandwidths in two directions to be allocated. The two directions are: (1) 45M to the node E, and (2) 35M to a node G. Since the node E has no more remaining channels available after the step sequence 1 is performed, the 45M outflow bandwidth from the node F to the node E cannot be allocated directly, unless the NIC is added to the node E. Thus, two NICs have to be preset to the node E when the step sequence 2 is performed. FIG. 19 illustrates the channel utilization of each node after the step sequence 2 is performed.

Figure 20:
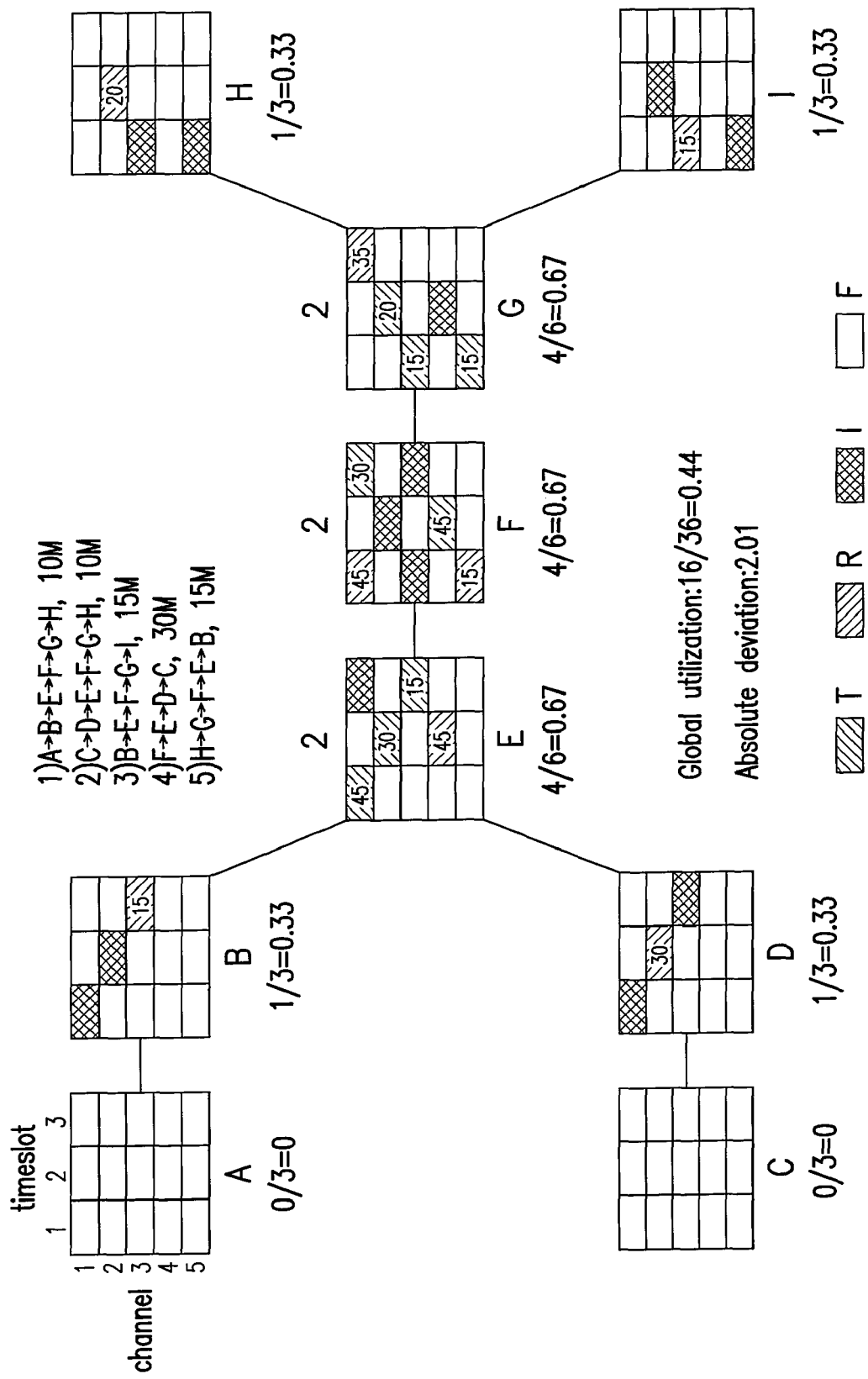

FIG. 20 illustrates the result after a step sequence 3 is performed. The step sequence 3 is the outflow bandwidth allocation of the node G. Similarly, since the free channels between the nodes G and F are not sufficient for the allocation of the additional flow, the NIC has to be added to each of the two nodes to perform the step sequence 3.

Figure 21:
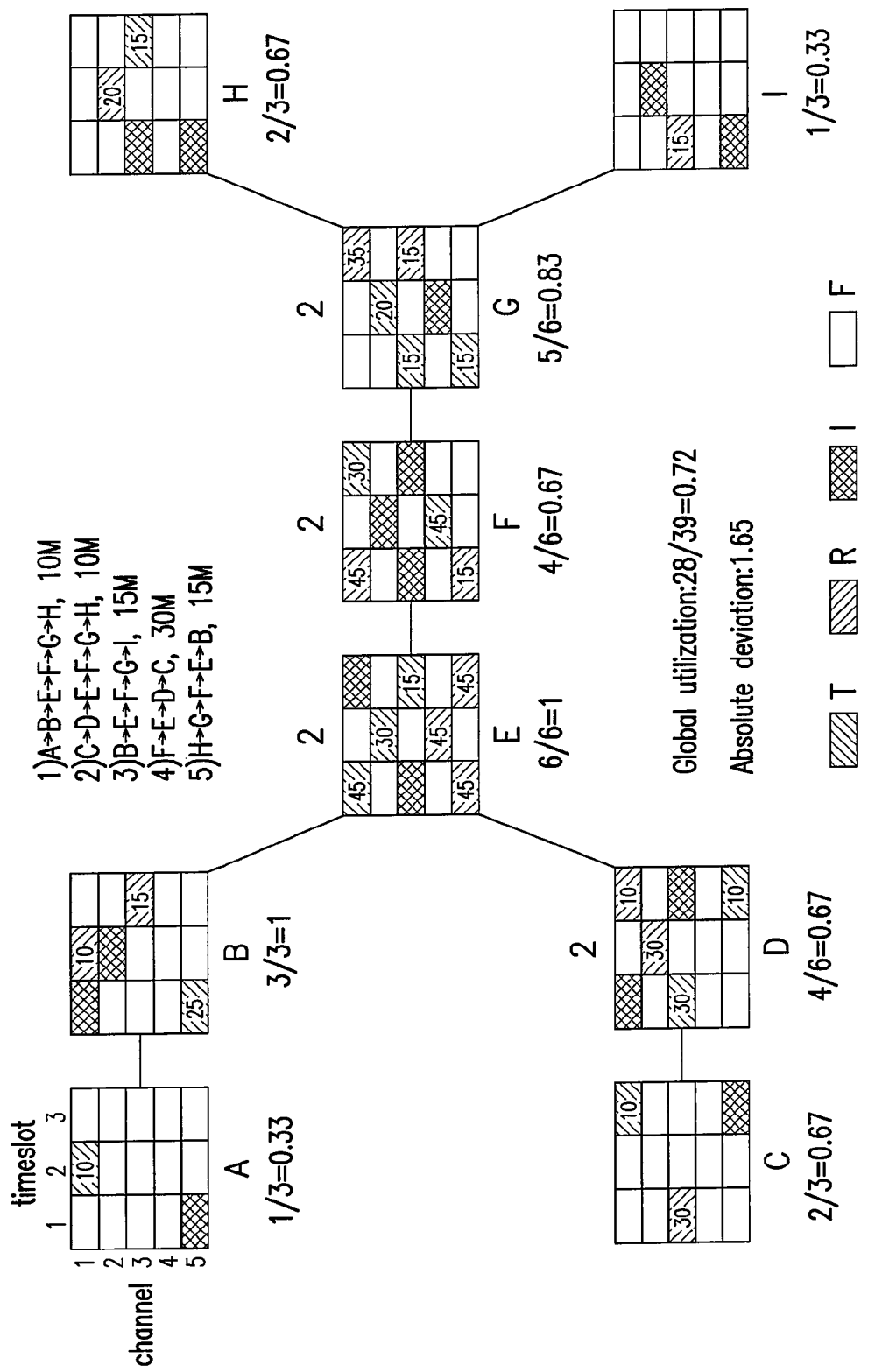

FIG. 21 illustrates the result after step sequences 4 to 9 are performed. All allocation operations are finished after the allocation of the outflow bandwidths of all nodes is performed. A possible number of the NICs required for finishing the allocation of all the preset flow is shown in FIG. 21, and the number of the NICs required for each node is completely identical to the calculated result provided in table two. It means based on the channel allocation algorithm of the present invention, the number of the NICs required on each node can be accurately calculated by formula (1), which is conducive to a network builder on design of the network.

In summary, the channel allocation of the WMN based on the IEEE 802.11s WiFi Mesh standard in the present invention can avoid the problems of the interferences in the same transmission path and in the adjacent transmission paths. Besides, since the time division technique is applied, a unique NIC may communicate with a plurality of the NICs, and the number of the NICs on the receiving node and the transmitting node are allowed to be asymmetric, such that the design of the network can be more flexible, and that the utilization rate of the channels and the bandwidths can be greatly improved.

The present invention is directed to the distributed channel allocation method for the mesh network having the multi-wireless network interface, by which the interference among the nodes can be avoided and the applicable bandwidth can be guaranteed.

The present invention is directed to the Wi-Fi mesh network, and directed to the channel allocation method for the backhaul routers in the WMN, wherein the WMN has a similar feature of multi-hop as that of the ad-hoc network. Thus, not only one optimal channel of one hop between the AP and the MN is considered, but also the suitable channels are assigned to all hops passed by the entire routing path. Meanwhile, the existing allocated channels are not interfered.

The present invention is directed to the distributed channel allocation method for the mesh network having the wireless network interface. By the distributed channel allocation, the interference situations are avoided in the wireless network communication, the allocated bandwidth can be fully utilized, and unnecessary depletion of the allocated bandwidth due to the interference can be avoided. Since there is no repetitive channel which is used within three hops, the allocated channels on this routing path do not interfere with each other.

The present invention is directed to the distributed channel allocation method for the mesh network having the wireless network interface. By this method, the time division technique is applied for dividing the transmission time of each wireless NIC, and the different non-overlapping channels can be assigned in the different timeslots. Unlike other studies that require a symmetrical number of the NICs between the receiving node and the transmitting node, a unique wireless NICs may communicate with a plurality of the wireless NICs according to the method disclosed in the present invention. The method provides the feature that the number of the NICs on a certain node can be adjusted to meet a communication requirement, by which the efficiency of the network flow is also significantly improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A distributed channel allocation method for a WMN system comprising a plurality of nodes, comprising:

determining one free channel or a plurality of free channels between adjacent nodes according to channel utilization of the nodes;

selecting the nodes which a routing path passes through according to the routing path and determining a start node and a target node from the nodes selected;

selecting the free channels to be used in a sequence from the target node to the start node to establish the routing path, wherein the selection of the free channels is in accordance with a requirement of a shortest routing path, and the selected free channels to be used are different from those used by the adjacent nodes; if a transmission path or a plurality of transmission paths is already allocated on the nodes of the routing path, a priority is given to the transmission path or paths, and during the free channel selection, the transmission path having the priority is considered first;

increasing a number of NICs on the nodes according to a bandwidth requirement wherein the bandwidth requirement is based on network flow; and selecting the free channels to be used in the sequence from the target node to the start node to establish the routing path satisfying the bandwidth requirement, wherein the selection of the free channels is in accordance with a requirement of the shortest routing path, and the selected free channels to be used are different from those used by the adjacent nodes, wherein the node utilization is:

$$\frac{\sum_{t=1}^{k} U_{x,t}}{I_x \times k},$$

wherein x∈V;

the global utilization is:

$$\frac{\sum_{x=1}^{n}\sum_{t=1}^{k} U_{x,t}}{\left(\sum_{x=1}^{n} I_x\right) \times k},$$

wherein x∈V, wherein V is a set of all the nodes in a network, and |V| is n, T representing the number of divided timeslots, wherein T=k, which is assumed to be k, T>0, $I_x$ representing the number of NICs on a node x, $U_{x,t}$ representing a number of allocated channels on the node x at a t-th timeslot, in which $U_{x,t} \leq I_x$ and $0 < t \leq T$.

2. The distributed channel allocation method as claimed in claim 1, wherein the selection of the free channels satisfies the condition that no repetitive channel is used within three hops.

3. The distributed channel allocation method as claimed in claim 1, wherein a three-tuple (a1, a2, a3) is defined as a combination of the free channels, a3 is a free channel of a present link, a2 is a free channel of a previous link, and a1 is a free channel of previous two links.

4. The distributed channel allocation method as claimed in claim 1, wherein the free channel or channels is/are not in a state of transmitting, receiving or interfered.

5. The distributed channel allocation method as claimed in claim 1, wherein a time division technique is added to the steps of determining the free channel or channels according to the channel utilization of the nodes, so as to increase the applicable free channel or channels.

6. The distributed channel allocation method as claimed in claim 1, wherein the selection of the free channels satisfies the condition that no repetitive channel is used within three hops.

7. The distributed channel allocation method as claimed in claim 1, wherein the free channel or channels is/are not in a state of transmitting, receiving or interfered.

8. The distributed channel allocation method as claimed in claim 1, wherein a time division technique is added to the steps of determining the free channel or channels according to the channel utilization of the nodes, so as to increase the applicable free channel or channels.

9. The distributed channel allocation method as claimed in claim 1, wherein a method of increasing the number of NICs on the nodes according to the bandwidth requirement comprises performing a channel allocation according to the routing path and the bandwidth; judging if there exists one of the nodes satisfying a condition, wherein the condition is a difference between a node utilization and a global utilization being greater than a threshold value if the channel allocation is unsuccessful; and adding the NIC to the node if the node exists.

10. The distributed channel allocation method as claimed in claim 1, further comprising:

presetting a network flow and a flow direction of transmitting and receiving from the nodes to the adjacent nodes according to a requirement of a system;

selecting the nodes which a routing path passes through according to the routing path and determining a start node and a target node;

selecting the number of NICs on the nodes according to the network flow and the flow direction; and selecting a free channel or channels to be used in a sequence from the target node to the start node to establish the routing path satisfying the bandwidth requirement, wherein the selected free channels to be used are different from those used by the adjacent nodes.

11. The distributed channel allocation method as claimed in claim 10, wherein the number of the NICs required for each node is calculated by a following formula:

$$\left\lceil \frac{\sum_{j=1}^{n}\left\lceil\frac{F_{ij}}{\frac{B}{T}}\right\rceil + \sum_{k=1}^{n}\left\lceil\frac{F_{ki}}{\frac{B}{T}}\right\rceil}{T} \right\rceil$$

wherein n is a sum of all the nodes in a network, B is a total bandwidth of NICs, and T is the number of divided timeslots on the NICs.

12. The distributed channel allocation method as claimed in claim 10, wherein the selection of the free channel or channels satisfies the condition that no repetitive channel is used within three hops.

13. The distributed channel allocation method as claimed in claim 10, wherein a time division technique is added to the steps of determining the free channel or channels according to a channel utilization of the nodes to increase the applicable free channel or channels.

14. A WMN system, having a function of a distributed channel allocation, wherein the WMN comprises a plurality of nodes, and the distributed channel allocation comprises:
   determining a free channel or a plurality of free channels according to a channel utilization of the nodes;
   selecting the nodes which a routing path passes through according to the routing path; and
   selecting the free channels to be used from the nodes on the routing path in order to establish the routing path, wherein the selection of the free channels is in accordance with the requirement of a shortest routing path, and the selected free channels to be used are different from those used by the adjacent nodes, if a transmission path or a plurality of transmission paths is already allocated on the nodes of the routing path, a priority is given to the transmission path or paths, and during the free channel selection, the transmission path having the priority is considered first, and the distributed channel allocation further comprises increasing the number of NICs on the nodes according to a bandwidth requirement,
   wherein a method of increasing the number of NICs on the nodes according to the bandwidth requirement comprises performing a channel allocation according to the routing path and the bandwidth; judging if there exists one of the nodes satisfying a condition, wherein the condition is a difference between a node utilization and a global utilization being greater than a threshold value if the channel allocation is unsuccessful; and adding the NIC to the node if the node exists.

15. The WMN system as claimed in claim 14, wherein the selection of the free channel satisfies the condition that no repetitive channel is used within three hops.

16. The WMN system as claimed in claim 14, wherein the free channel or channels is/are not in a state of transmitting, receiving or interfered.

17. The WMN system as claimed in claim 14, wherein a time division technique is added to the steps of deteiniining the free channel or channels according to the channel utilization of the nodes, so as to increase the applicable free channel or channels.

18. The WMN system as claimed in claim 14, wherein a time division technique is added to the steps of detennining the free channel or channels according to the channel utilization of the nodes, so as to increase the applicable free channel or channels.

* * * * *